(12) United States Patent
Grzeskowiak, II et al.

(10) Patent No.: US 12,151,395 B2
(45) Date of Patent: Nov. 26, 2024

(54) TEXTURED STONE SLABS, SYSTEMS, AND METHODS

(71) Applicant: Cambria Company LLC, Eden Prairie, MN (US)

(72) Inventors: Jon Louis Grzeskowiak, II, Prior Lake, MN (US); Martin E. Davis, Excelsior, MN (US)

(73) Assignee: Cambria Company LLC, Eden Prairie, MN (US)

( * ) Notice: Subject to any disclaimer, the term of this patent is extended or adjusted under 35 U.S.C. 154(b) by 91 days.

(21) Appl. No.: 17/744,501

(22) Filed: May 13, 2022

(65) Prior Publication Data

US 2022/0362966 A1   Nov. 17, 2022

Related U.S. Application Data

(60) Provisional application No. 63/188,403, filed on May 13, 2021.

(51) Int. Cl.
| | |
|---|---|
| *B32B 3/10* | (2006.01) |
| *B28B 1/00* | (2006.01) |
| *B44C 1/22* | (2006.01) |

(52) U.S. Cl.
CPC .............. *B28B 1/005* (2013.01); *B44C 1/222* (2013.01)

(58) Field of Classification Search
None
See application file for complete search history.

(56) References Cited

U.S. PATENT DOCUMENTS

| | | |
|---|---|---|
| 178,308 A | 6/1876 | Leathers et al. |
| 1,212,331 A | 1/1917 | Denivelle |
| 1,474,817 A | 11/1923 | Fincke |
| 1,485,810 A | 3/1924 | Parker, Jr. et al. |
| 1,568,070 A | 1/1926 | Jennens |
| 1,570,538 A | 1/1926 | Thomas |
| 1,711,701 A | 5/1929 | Speck |
| 1,939,045 A | 12/1933 | Fredriksen |
| D92,186 S | 5/1934 | Little |
| 2,280,488 A | 4/1942 | Jenkins et al. |
| 2,474,654 A | 6/1949 | Carlson |

(Continued)

FOREIGN PATENT DOCUMENTS

| | | |
|---|---|---|
| CA | 2896383 | 7/2017 |
| CH | 190667 | 7/1937 |

(Continued)

OTHER PUBLICATIONS

Machine translation of KR100771187B1 (Year: 2007).*

(Continued)

*Primary Examiner* — Christopher M Polley
(74) *Attorney, Agent, or Firm* — Fish & Richardson P.C.

(57) ABSTRACT

Stone slabs, and systems and methods of forming slabs, are described. Some example slabs include a first pattern defined by a first particulate mineral mix and a second pattern defined by a second particulate mineral mix different from the first particulate mineral mix. Locations of the first pattern have a first average thickness perpendicular to the slab width and the slab length, and locations of the second pattern have a second average thickness perpendicular to the slab width and the slab length that is different from the first average thickness.

20 Claims, 8 Drawing Sheets

(56) References Cited

U.S. PATENT DOCUMENTS

| | | |
|---|---|---|
| 2,556,486 A | 6/1951 | Smith |
| 3,013,370 A | 12/1961 | Vida |
| 3,088,713 A | 5/1963 | Gard |
| 3,164,647 A | 1/1965 | Fischler |
| 3,177,279 A | 4/1965 | Bilodeau |
| 3,245,129 A | 4/1966 | Entz |
| 3,245,648 A | 4/1966 | Johansson et al. |
| 3,255,024 A | 6/1966 | Alexander et al. |
| 3,318,984 A | 5/1967 | Dussel |
| 3,578,276 A | 5/1971 | Soderlund |
| 3,628,766 A | 12/1971 | Hartmann |
| 3,670,060 A | 6/1972 | Cuffaro et al. |
| 3,712,825 A | 1/1973 | Yocum |
| 3,743,235 A | 7/1973 | Shelley |
| 3,819,436 A | 6/1974 | Allen |
| 3,843,089 A | 10/1974 | Scholz et al. |
| 3,870,777 A | 3/1975 | Jakel |
| 3,904,791 A | 9/1975 | Iverson et al. |
| 3,990,212 A | 11/1976 | Flodin |
| 4,092,199 A | 5/1978 | Ungar et al. |
| 4,094,941 A | 6/1978 | Manners et al. |
| 4,204,820 A | 5/1980 | Toncelli |
| 4,254,077 A | 3/1981 | Fontana et al. |
| 4,388,975 A | 6/1983 | Hirano |
| 4,421,466 A | 12/1983 | Heitzman |
| 4,466,500 A | 8/1984 | Mosher et al. |
| 4,484,645 A | 11/1984 | Inoue |
| 4,680,155 A | 7/1987 | Rochefort et al. |
| 4,698,010 A | 10/1987 | Toncelli |
| 4,914,870 A | 4/1990 | Toncelli |
| 5,022,193 A | 6/1991 | Toncelli |
| 5,069,939 A | 12/1991 | McKinnon |
| 5,080,085 A | 1/1992 | Lovato |
| 5,266,253 A | 11/1993 | Dijkhuizen et al. |
| 5,445,772 A | 8/1995 | Uchida |
| 5,662,847 A | 9/1997 | Uchida et al. |
| 5,664,305 A | 9/1997 | Lawton et al. |
| 5,670,007 A | 9/1997 | Toncelli |
| 5,679,298 A | 10/1997 | Uchida et al. |
| 5,795,513 A | 8/1998 | Austin |
| 5,813,183 A | 9/1998 | Attley |
| 5,885,503 A | 3/1999 | Bordener |
| 5,976,642 A | 11/1999 | Yang |
| 6,080,234 A | 6/2000 | Bernard et al. |
| D428,590 S | 7/2000 | Lagaay |
| 6,103,160 A | 8/2000 | Uchida |
| 6,205,727 B1 | 3/2001 | Toncelli |
| 6,228,463 B1 | 5/2001 | Chen et al. |
| 6,237,294 B1 | 5/2001 | Rygiel |
| 6,461,552 B1 | 10/2002 | Geiger |
| 6,517,915 B1 | 2/2003 | Banus |
| 6,572,802 B1 | 6/2003 | Austin |
| D491,372 S | 6/2004 | Dugas et al. |
| 6,773,641 B1 | 8/2004 | Toncelli |
| 7,140,869 B2 | 11/2006 | Toncelli |
| D602,258 S | 10/2009 | Simione et al. |
| 7,771,680 B2 | 8/2010 | Gordienko |
| D623,319 S | 9/2010 | Martin |
| 7,815,827 B2 | 10/2010 | Cruz |
| 7,984,600 B2 | 7/2011 | Alford et al. |
| 8,030,441 B2 | 10/2011 | Toncelli |
| 8,101,113 B2 | 1/2012 | Castonguay et al. |
| 8,158,548 B2 | 4/2012 | Di Noto et al. |
| 8,333,916 B2 | 12/2012 | Jamrussamee et al. |
| D677,955 S | 3/2013 | Bender et al. |
| D678,556 S | 3/2013 | Metcalf |
| 8,398,954 B2 | 3/2013 | Gordienko |
| D682,557 S | 5/2013 | Lee |
| 8,436,075 B2 | 5/2013 | Buskila et al. |
| 8,636,941 B1 | 1/2014 | Ciuperca |
| 8,702,886 B2 | 4/2014 | Yaniv et al. |
| D705,954 S | 5/2014 | Choi et al. |
| D705,955 S | 5/2014 | Choi et al. |
| D714,559 S | 10/2014 | Mccuaig |
| D715,563 S | 10/2014 | Zeamer |
| 8,940,223 B2 | 1/2015 | Toncelli |
| D731,086 S | 6/2015 | Martin et al. |
| 9,073,239 B2 | 7/2015 | Banus |
| 9,085,090 B2 | 7/2015 | Toncelli |
| 9,186,819 B1 | 11/2015 | Grzeskowiak, II et al. |
| D746,064 S | 12/2015 | Zeamer |
| D746,066 S | 12/2015 | Mccuaig |
| 9,260,344 B1 | 2/2016 | Zhao |
| 9,289,923 B1 | 3/2016 | Grzeskowiak, II et al. |
| 9,427,896 B1 | 8/2016 | Xie |
| 9,469,990 B2 | 10/2016 | Dirkson |
| 9,511,516 B2 | 12/2016 | Xie |
| D776,299 S | 1/2017 | Clevenger |
| 9,671,274 B1 | 6/2017 | Xie |
| 9,707,698 B1 | 7/2017 | Xie |
| 9,718,303 B2 | 8/2017 | Grzeskowiak et al. |
| 9,993,942 B2 | 6/2018 | Grzeskowiak, II et al. |
| 10,300,626 B2 | 5/2019 | Grzeskowiak et al. |
| 10,569,506 B2 | 2/2020 | Jin et al. |
| 10,773,418 B2 | 9/2020 | Grzeskowiak et al. |
| 2002/0081388 A1 | 6/2002 | Batliner et al. |
| 2004/0032044 A1 | 2/2004 | Toncelli |
| 2004/0175514 A1 | 9/2004 | Stiattest |
| 2005/0013991 A1 | 1/2005 | Yang |
| 2005/0055931 A1 | 3/2005 | Rochette |
| 2006/0101752 A1 | 5/2006 | Sakai et al. |
| 2006/0193693 A1 | 8/2006 | Congdon |
| 2007/0057408 A1 | 3/2007 | Sandqvist et al. |
| 2007/0216058 A1 | 9/2007 | Carreras-Maldonado et al. |
| 2007/0248836 A1 | 10/2007 | Linde |
| 2008/0113123 A1 | 5/2008 | Izzo |
| 2008/0138595 A1 | 6/2008 | Bordener |
| 2008/0153688 A1 | 6/2008 | Borens et al. |
| 2008/0296795 A1 | 12/2008 | Willis-Papi |
| 2008/0315448 A1 | 12/2008 | Cruz |
| 2009/0047503 A1 | 2/2009 | Godi et al. |
| 2009/0105391 A1 | 4/2009 | Buskila et al. |
| 2009/0274909 A1 | 11/2009 | Bergevin et al. |
| 2010/0048772 A1 | 2/2010 | Moore |
| 2010/0159220 A1 | 6/2010 | Toncelli |
| 2010/0194005 A1 | 8/2010 | Toncelli |
| 2011/0034586 A1 | 2/2011 | Buskila et al. |
| 2011/0104451 A1 | 5/2011 | Yaniv et al. |
| 2011/0166696 A1 | 7/2011 | Nigon |
| 2011/0283859 A1 | 11/2011 | Codemo |
| 2012/0003453 A1 | 1/2012 | Buskila et al. |
| 2012/0153526 A1 | 6/2012 | Ko et al. |
| 2012/0183735 A1 | 7/2012 | Moreno et al. |
| 2012/0283384 A1 | 11/2012 | Cox |
| 2013/0130036 A1 | 5/2013 | Bettiol et al. |
| 2013/0137810 A1 | 5/2013 | Shin |
| 2013/0196251 A1 | 8/2013 | Di Noto et al. |
| 2013/0341254 A1 | 12/2013 | Bauer |
| 2014/0141961 A1 | 5/2014 | Koszo |
| 2015/0064315 A1 | 3/2015 | van Blokland |
| 2015/0136311 A1 | 5/2015 | Mjelde |
| 2015/0314475 A1 | 11/2015 | Banus |
| 2015/0360507 A1 | 12/2015 | Benito |
| 2016/0052164 A1 | 2/2016 | Grzeskowiak, II et al. |
| 2016/0052333 A1 | 2/2016 | Grzeskowiak, II et al. |
| 2016/0052334 A1 | 2/2016 | Grzeskowiak, II et al. |
| 2016/0089818 A1 | 3/2016 | Xie |
| 2016/0290852 A1 | 10/2016 | Chandler et al. |
| 2017/0210041 A1 | 7/2017 | Toncelli |
| 2018/0126673 A1* | 5/2018 | Sanchis Brines ..... B29C 67/244 |
| 2018/0290333 A1 | 10/2018 | Grzeskowiak et al. |
| 2019/0283270 A1* | 9/2019 | Grzeskowiak, II ..... B28B 3/022 |
| 2020/0047372 A1 | 2/2020 | Chung |
| 2021/0308975 A1 | 10/2021 | Grzeskowiak et al. |

FOREIGN PATENT DOCUMENTS

| | | |
|---|---|---|
| CN | 1153751 | 7/1997 |
| CN | 1184039 | 6/1998 |
| CN | 1718403 | 1/2006 |
| CN | 1301199 | 2/2007 |
| CN | 1931545 | 3/2007 |
| CN | 1966229 | 5/2007 |
| CN | 100463788 | 2/2009 |

(56) References Cited

FOREIGN PATENT DOCUMENTS

| | | |
|---|---|---|
| CN | 101486217 | 7/2009 |
| CN | 101564868 | 10/2009 |
| CN | 101864830 | 10/2010 |
| CN | 102049809 | 5/2011 |
| CN | 102050598 | 5/2011 |
| CN | 202208056 | 5/2012 |
| CN | 102581927 | 7/2012 |
| CN | 302025837 | 8/2012 |
| CN | 102806599 | 12/2012 |
| CN | 102950955 | 3/2013 |
| CN | 103481358 | 1/2014 |
| DE | 4320860 | 1/1994 |
| DE | 19640281 | 4/1997 |
| DE | 102010053520 | 2/2012 |
| EM | 000359971-0001 | 1/2005 |
| EM | 00359971-0002 | 1/2005 |
| EM | 00359971-0003 | 1/2005 |
| EM | 000359971-0005 | 1/2005 |
| EM | 001418057-0006 | 3/2014 |
| EM | 001417646-0001 | 10/2014 |
| EM | 001417646-0010 | 10/2014 |
| EM | 001417646-0015 | 10/2014 |
| EM | 001417737-0021 | 10/2014 |
| EP | 0511545 | 11/1992 |
| EP | 0558247 | 9/1993 |
| EP | 0320638 | 6/1994 |
| EP | 0734819 | 10/1996 |
| EP | 0970790 | 1/2000 |
| EP | 1005967 | 6/2000 |
| EP | 0940235 | 7/2003 |
| EP | 1717000 | 11/2006 |
| EP | 1787779 | 5/2007 |
| EP | 1930142 | 6/2008 |
| EP | 2460631 | 6/2012 |
| EP | 1905749 | 7/2012 |
| EP | 2065150 | 3/2014 |
| EP | 2944443 | 11/2015 |
| EP | 3095768 | 11/2016 |
| ES | 2087313 | 7/1996 |
| ES | 2187313 | 6/2003 |
| ES | 2285150 | 11/2007 |
| FR | 2313183 | 3/1979 |
| GB | 2233640 | 1/1991 |
| JP | H071418 | 1/1995 |
| JP | 2004270406 | 9/2004 |
| JP | D1454121 | 10/2012 |
| JP | 2014069350 | 4/2014 |
| KR | 10-0771187 | 10/2007 |
| KR | 100771187 B1 * | 10/2007 |
| KR | 10-2009-0108786 | 10/2009 |
| KR | 10-2014-0080212 | 6/2014 |
| KR | 300777994.000 | 12/2014 |
| KR | 1020150088686 | 8/2015 |
| WO | WO 198911457 | 11/1989 |
| WO | WO D037756-004 | 12/1996 |
| WO | WO D037756-007 | 12/1996 |
| WO | WO D037756-009 | 12/1996 |
| WO | WO 200043192 | 7/2000 |
| WO | WO 2001045921 | 1/2001 |
| WO | WO 2002007939 | 1/2002 |
| WO | WO 2003027042 | 4/2003 |
| WO | WO 2004004882 | 1/2004 |
| WO | WO 2005068146 | 7/2005 |
| WO | WO 2005097447 | 10/2005 |
| WO | WO 2006100321 | 9/2006 |
| WO | WO 2006134179 | 12/2006 |
| WO | WO 2007080059 | 7/2007 |
| WO | WO 2008000168 | 1/2008 |
| WO | WO 2008015596 | 2/2008 |
| WO | WO 2009010406 | 1/2009 |
| WO | WO 2010097727 | 9/2010 |
| WO | WO 2014108582 | 7/2014 |
| WO | WO 2016028780 | 2/2016 |

OTHER PUBLICATIONS

"Cambria introduces the new costal collection," [press release] Feb. 4, 2014, 2 pages.

"Certificate of Service of Complaint in *Cambria Company LLC* v. *Hirsch Glass Corp.*," Exhibit 1034 in IPR2022-00582, dated Feb. 11, 2022, 1 page.

"Certificate of Service of Complaint in *Cambria Company LLC* v. *Hirsch Glass Corp.*," Exhibit 1034 in IPR2022-00583, dated Feb. 11, 2022, 1 page.

"Certificate of Service of Complaint in *Cambria Company LLC* v. *Hirsch Glass Corp.*," Exhibit 1034 in IPR2022-00589, dated Feb. 11, 2022, 1 page.

"Curriculum Viate of Pierpaolo Tassone," Exhibit 1033 in IPR2022-00582, dated Feb. 11, 2022, 4 pages.

"Curriculum Viate of Pierpaolo Tassone," Exhibit 1033 in IPR2022-00583, dated Feb. 11, 2022, 4 pages.

"Declaration of Al Pacheco," Exhibit 1028 in IPR2022-00582, dated Feb. 10, 2022, 4 pages.

"Declaration of Al Pacheco," Exhibit 1028 in IPR2022-00583, dated Feb. 10, 2022, 4 pages.

"Declaration of Pierpaolo Tassone," Exhibit 1004 in IPR2022-00589, dated Feb. 8, 2022, 208 pages.

"Declaration of Pierpaolo Tassone," Exhibit 1031 in IPR2022-00582, dated Feb. 9, 2022, 123 pages.

"Declaration of Pierpaolo Tassone," Exhibit 1032 in IPR2022-00583, dated Feb. 9, 2022, 133 pages.

"MS International, Inc. General eBrochure 2014," Exhibit 1027 in IPR2022-00583 and IPR2022-00582, dated Feb. 28, 2014, 164 pages.

"MSI Surfaces, The Truth About Calacatta Marble," Exhibit 1029 in IPR2022-00583 and IPR2022-00582, dated Jan. 23, 2013, 13 pages.

"What Is the Standard Width of a Kitchen Countertop," Exhibit 1035 in IPR2022-00583 and IPR2022-00582, dated Aug. 30, 2019, 6 pages.

[No Author Listed], "Vadara Quartz Kitchen" available on or before Jan. 1, 2018, retrieved on Sep. 7, 2021, retrieved from URL <https://www.houzz.com/hznb/photos/vadara-quartz-kitchen-transitional-orange-county-phvw-vp~98923368>, 4 pages.

Allen + Roth, Santa Cecilia Granite Brown Kitchen Countertop Item #1068221Model #NG2002, published on or before Sep. 15, retrieved on Sep. 7, 2021, retrieved from URL <https://www.lowes.com/pd/allen-roth-Santa-Cecilia-Granite-Kitchen-Countertop-Sample/1000507485> , 2018, 6 pages.

Amendment Under 37 C.F.R. § 1.111, U.S. Appl. No. 15/911,547 to Benito Lopez et al., Nov. 24, 2020, 15 pages.

Breton Bretonstone Slabs, "Natural Stone Surfaces by Breton Technology", Breton, Cosentino Exhibit No. 1010 in Cases IPR2021-00214, IPR2021-00215, IPR2021-00216, and PGR2021-00010, 60 pages, filing date Nov. 24, 2020.

BretonUSA.com [online], "Bretonstone, " 2019, retrieved on May 19, 2022, retrieved from URL<https://www.bretonusa.com/en/stone/news/bretonstone-bridge-saws>, 17 pages.

*Cambria Company LLC* vs *Consentino S.A., C & C North America Inc.*, Case No. IPR 2021-00214, U.S. Pat. No. 10,252,440, Petition for Inter Partes Review of U.S. Pat. No. 10,252,440, 88 pages, filing date Nov. 24, 2020.

*Cambria Company LLC* vs *Consentino S.A., C & C North America Inc.*, Case No. IPR 2021-00216, U.S. Pat. No. 10,195,762, Petition for Inter Partes Review of U.S. Pat. No. 10,195,762, 104 pages, filing date Nov. 24, 2020.

*Cambria Company LLC* vs *Consentino S.A., C & C North America Inc.*, Civil Action 6:20-CV-00894-ADA, Declaration of Kevin P. Trumble, Ph.D., In Support of Plaintiffs Motion For Preliminary Injunction Cosentino Exhibit No. 1014 in Cases IPR2021-00214, IPR2021-00216, and PGR2021-00010, 62 pages, filing date Nov. 24, 2020.

Carla Aston Design, Carla Aston Design and Portfolio, published on or before Oct. 27, 2012, retrieved from URL <https://carlaaston.com/designed/vein-cut-stone-texture-with-zen-ambience> 5 pages.

Certified English Translation of Chinese Application for Invention Patent Publication No. CN 1718403A to Liu, Exhibit No. 1007 in IPR2022-00589, dated Feb. 2022, pages.

(56) References Cited

OTHER PUBLICATIONS

Cole et al., "In pursuit of the cutting edge", Chicago Tribune, Dec. 7, 2010, Exhibit H, Cosentino Exhibit No. 1019 in Cases IPR2021-00214, IPR2021-00215, IPR2021-00216, and PGR2021-00010, 6 pages, filing date Nov. 24, 2020.
*Cosentino S.A.U and C & C North America Inc.,* Petitioners v. *Cambria Company LLC,* Patent Owner, US Patent and Trademark Office, Case No IPR 2021-00214, U.S. Pat. No. 10,252,440, Declaration of Dr. John R. Dorgan in Support of Petition for Inter Partes Review of U.S. Pat. No. 10,252,440, Cosentino Exhibit No. 1004, 104 pages, filing date Nov. 24, 2020.
*Cosentino S.A.U and C & C North America Inc.,* Petitioners v. *Cambria Company LLC,* Patent Owner, US Patent and Trademark Office, Case No. IPR 2021-00214, U.S. Pat. No. 10,252,440, Notice of Filing Date Accorded to Petition and Time for Filing Patent Owner Preliminary Response, 6 pages, Dec. 9, 2020.
*Cosentino S.A.U and C & C North America Inc.,* Petitioners v. *Cambria Company LLC,* Patent Owner, US Patent and Trademark Office, Case No. IPR 2021-00214, U.S. Pat. No. 10,252,440, Patent Owners Mandatory Notices Pursuant to 37 C.F.R. 42.8, 5 pages, filing date Dec. 15, 2020.
*Cosentino S.A.U and C & C North America Inc.,* Petitioners v. *Cambria Company LLC,* Patent Owner, US Patent and Trademark Office, Case No IPR 2021-00215, U.S. Pat. No. 9,289,923, Declaration of Dr. John R. Dorgan in Support of Petition for Inter Partes Review of U.S. Pat. No. 9,289,923, Cosentino Exhibit No. 1004, 134 pages, filing date Nov. 24, 2020.
*Cosentino S.A.U and C & C North America Inc.,* Petitioners v. Cambria Company LLC, Patent Owner, US Patent and Trademark Office, Case No. IPR 2021-00215, U.S. Pat. No. 9,289,923, Notice of Filing Date Accorded to Petition and Time for Filing Patent Owner Preliminary Response, 5 pages, Dec. 15, 2020.
*Cosentino S.A.U and C & C North America Inc.,* Petitioners v. *Cambria Company LLC,* Patent Owner, US Patent and Trademark Office, Case No. IPR 2021-00215, U.S. Pat. No. 9,289,923, Patent Owners Mandatory Notices Pursuant to 37 C.F.R. 42.8, 5 pages, filing date Dec. 15, 2020.
*Cosentino S.A.U and C & C North America Inc.,* Petitioners v. *Cambria Company LLC,* Patent Owner, US Patent and Trademark Office, Case No IPR 2021-00215, U.S. Pat. No. 9,289,923, Petition for Inter Partes Review of U.S. Pat. No. 9,289,923, 88 pages, filing date Nov. 24, 2020.
*Cosentino S.A.U and C & C North America Inc.,* Petitioners v. *Cambria Company LLC,* Patent Owner, US Patent and Trademark Office, Case No. IPR 2021-00216, U.S. Pat. No. 10,195,762, Notice of Filing Date Accorded to Petition and Time for Filing Patent Owner Preliminary Response, 5 pages, Dec. 15, 2020.
*Cosentino S.A.U and C & C North America Inc.,* Petitioners v. *Cambria Company LLC,* Patent Owner, US Patent and Trademark Office, Case No. IPR 2021-00216, U.S. Pat. No. 10,195,762, Patent Owners Mandatory Notices Pursuant to 37 C.F.R. 42.8, 5 pages, filing date Dec. 15, 2020.
*Cosentino S.A.U and C & C North America Inc.,* Petitioners v. *Cambria Company LLC,* Patent Owner, US Patent and Trademark Office, Case No PGR 2021-00010, U.S. Pat. No. 10,773,418, Declaration of Dr. John R. Dorgan in Support of Petition for Inter Partes Review of U.S. Pat. No. 10,773,418, Cosentino Exhibit No. 1004, 169 pages, filing date Nov. 24, 2020.
*Cosentino S.A.U and C & C North America Inc.,* Petitioners v. *Cambria Company LLC,* Patent Owner, US Patent and Trademark Office, Case No. PGR2021-00010 U.S. Pat. No. 10,773,418, Notice of Filing Date Accorded to Petition and Time for Filing Patent Owner Preliminary Response, 6 pages, Dec. 9, 2020.
*Cosentino S.A.U and C & C North America Inc.,* Petitioners v. *Cambria Company LLC,* Patent Owner, US Patent and Trademark Office, Case No. PGR2021-00010, U.S. Pat. No. 10,773,418, Petition for Post Grant Review of U.S. Pat. No. 10,773,418, 120 pages, filing date Nov. 24, 2020.
*Cosentino S.A.U and C & C North America Inc.,* Petitioners v. *Cambria Company LLC,* Patent Owner, US Patent and Trademark Office, Case No. PGR2021-00010, U.S. Pat. No. 10,773,418, Patent Owners Mandatory Notices Pursuant to 37 C.F.R. 42.8, 5 pages, filing date Dec. 15, 2020.
*Cosentino S.A.U and C & C North America Inc.,* Petitioners v. *Cambria Company LLC,* Patent Owner, US Patent and Trademark Office, Civil Action 6:20-CV-00894-ADA, Declaration of Kevin P. Trumble, Ph.D., in Support of Plaintiffs Motion for Preliminary Injunction, Cosentino Exhibit No. 1014 in Case IPR2021-00215, 62 pages, filing date Nov. 24, 2020.
*Cosentino S.A.U and C & C North America Inc.,* Petitioners v. *Cambria Company LLC,* Patent Owner, US Patent and Trademark Office, Declaration of Dr. John Dorgan in Support of Petition for Inter Partes Review of U.S. Pat. No. 10,195,762, Cosentino Exhibit No. 1004 in Case IPR2021-00216, 222 pages, filing date Nov. 24, 2020.
Cosentino's, Caroline Summer Granite Brown Kitchen Countertop Item #416339Model #902166, published on or before Aug. 21, 2017, retrieved on Sep. 7, 2021, retrieved from URL <https://www.lowes.com/pd/SenSa-Caroline-Summer-Granite-Kitchen-Countertop-Sample/50142019?cm_mmc=shp-_-c-_-prd-_-kab-_-google-_-pla-_-233-_-soscountertopproductandaccess-_-50142019-_-0&placeholder=null&ds_rl=1286981&gclid=EAIaIQobChMIj-jD1ZuQ8AIVaz6tBh0wowA1EAQYBSABEgLIKPD_BwE&gclsrc=aw.ds> 11 pages.
Countertops and Architectural Surfaces, The Official Publication of the International Surface Fabricators Association, vol. 8, Issue 1, Quarter 1, 2015, Cosentino Exhibit No. 1023 in Cases IPR2021-00214, IPR2021-00215, IPR2021-00216, and PGR2021-00010, 52 pages, filing date Nov. 24, 2020.
DiClerico, "What Is the Difference Between Quartz and Quartzite?", Exhibit K, Cosentino Exhibit No. 1022 in Cases IPR2021-00214, IPR2021-00215, IPR2021-00216, and PGR2021-00010, 3 pages. Apr. 9, 2016.
Exhibit J, Galloway Cambria 2015, Cosentino Exhibit No. 1021 in Cases IPR2021-00214, IPR2021-00215, IPR2021-00216, and PGR2021-00010, 3 pages, filing date Nov. 24, 2020.
ExpressKitchenAndBath.com [online], "Leathered Finishes," available on or before Jul. 8, 2018, via Internet Archive: Wayback Machine URL <http://web.archive.org/web/20180708113334/http://expresskitchenandbath.com/1277-2/>, retrieved on May 18, 2022, URL<http://expresskitchenandbath.com/1277-2/>, 4 pages.
Freedman, "Clay Product-Faced Precast Concrete Panels," PCI Journal, Jan.-Feb. 1994, 39: 20-36, 17 pages.
HanStone Quarts by Hanwha Surfaces "Specifications", HanStone Quarts, Cosentino Exhibit No. 1011 in Cases IPR2021-00214, IPR2021-00215, IPR2021-00216, and PGR2021-00010, 48 pages, filing date Nov. 24, 2020.
*Hirsch Glass Corp., d/b/a Spectrum Quartz,* Petitioner, v. *Cambria Company LLC,* Case No. IPR2022-00582, Patent Owner; U.S. Pat. No. 9,718,303, filed on Feb. 11, 2022, 174 pages.
*Hirsch Glass Corp., d/b/a Spectrum Quartz,* Petitioner, v. *Cambria Company LLC,* Case No. IPR2022-00583, Patent Owner; U.S. Pat. No. 10,300,626, filed on Feb. 11, 2022, 172 pages.
*Hirsch Glass Corp., d/b/a Spectrum Quartz,* Petitioner, v. *Cambria Company LLC,* Case No. IPR2022-00589, Patent Owner; U.S. Pat. No. 9,993,942, filed on Feb. 10, 2022, 184 pages.
Invention Patent Application for Chinese Publication No. 102806599 A, "Quartz stone with predetermined three-dimensional colored patterns and linear patterns and preparation method thereof", English Translation and Certification, Exhibit 1006 in Cases IPR2021-00214, IPR2021-00215, IPR2021-00216, and PGR2021-00010, 54 pages, dated Dec. 5, 2012.
Invention Patent Application for WO Publication No. 2008/000168, "A Mold System For Making The Products With Multi-Color 3D Patterns and Its Methods", English Translation and Certification, Exhibit 1008 in Cases IPR2021-00214, IPR2021-00215, IPR2021-00216, and PGR2021-00010, 63 pages, dated Jan. 3, 2008.
Kai Herrmann, "5th pole Golden abstract" photograph, available on or before Jan. 1, 2009, retrieved on Sep. 7, 2021, retrieved from URL <https://www.saatchiart.com/art/Photography-5th-pole-golden-abstract/262364/1237075/view>, 6 pages.
MGTStoneCo.com [online], "Stone Surfaces Finishes," available on or before Dec. 13, 2017, via Internet Archive: Wayback Machine

(56) References Cited

OTHER PUBLICATIONS

URL <http://web.archive.org/web/20171213055415/https://www.mgtstoneco.com/info/stone-surface-finishes>, retrieved on May 18, 2022, URL<https://www.mgtstoneco.com/info/stone-surface-finishes>, 5 pages.
MSI, "The Truth About Calacatta Marble", Jan. 23, 2013, Cosentino Exhibit No. 1018 in Cases IPR2021-00214, IPR2021-00215, IPR2021-00216, and PGR2021-00010, 12 pages, filing date Nov. 24, 2020.
Neal's Design Remodel, Granite vs. Quartz in the Kitchen, May 23, 2011, retrieved on Sep. 7, 2021, <https://www.youtube.com/watch?app-desktop&v=2d3XcgtUybU> [Video Submission].
Ninevian, "Abstract vector seamless background wallpaper stock ID:477881937", published on Aug. 28, 2013, retrieved on Sep. 7, 2021, retrieved from URL <https://www.istockphoto.com/vector/abstract-vector-seamless-background-wallpaper-gm477881937-26697001>, 8 pages.
Patent Owner's Preliminary Response Under 37 C.F.R § 42.107, Case No. IPR2022-00582, Patent Owner; U.S. Pat. No. 9,718,303, filed on May 17, 2022, 64 pages.
Patent Owner's Preliminary Response Under 37 C.F.R § 42.107, Case No. IPR2022-00583, Patent Owner; U.S. Pat. No. 10,300,626, filed on May 17, 2022, 67 pages.
Patent Owner's Preliminary Response Under 37 C.F.R § 42.107, Case No. IPR2022-00589, Patent Owner; U.S. Pat. No. 9,993,942, filed on May 17, 2022, 71 pages.
Professor John R. Dorgan Curriculum, Chemical Engineering and Materials Sciences Michigan State University, Cosentino Exhibit No. 1003 in Cases IPR2021-00214, IPR2021-00215, IPR2021-00216, and PGR2021-00010, 9 pages, filing date Nov. 24, 2020.
Prosecution History of U.S. Pat. No. 10,300,626, Exhibit 1024 in IPR2022-00583, filed Feb. 11, 2022, 263 pages.
Prosecution History of U.S. Pat. No. 9,186,819, Exhibit 1003 in IPR2022-00589, filed Feb. 9, 2022, 207 pages.
Prosecution History of U.S. Pat. No. 9,718,303, Exhibit 1022 in IPR2022-00580, filed Feb. 11, 2022, 160 pages.
Prosecution History of U.S. Pat. No. 9,993,942, Exhibit 1002 in IPR2022-00589, filed Feb. 10, 2022, 470 pages.
Restructured Surfaces.com [online], "Surface Inclusions," retrieved on Jun. 15, 2022, retrieved from URL <https://restructured-surfaces.com/solution/surface-inclusions/>, 3 pages.
Santamargherita.com [online], "SM Quartz," available on or before Sep. 18, 2020, via Internet Archive: Wayback Machine URL <http://web.archive.org/web/20200901000000*/https://www.santamargherita.net/us/sm-quartz/>, retrieved on May 18, 2022, URL<https://www.santamargherita.net/us/sm-quartz/>, 8 pages.
Stone & Tile Shoppe, Inc., "12×12 Granite Field Tile SKU: ISHT1134", published on or before May 1, 2019, 1 page.
Stonecontact.com [online], "Artificial Stone Factory Price Calacatta Marble Vein Quartz Slabs", available on or before Sep. 7, 2021, retrieved on Sep. 7, 2021, retrieved from URL, <https://www.stonecontact.com/products-a642705/artificial-stone-factory-price-calacatta-marble-vein-quartz-slabs> , 8 pages.
TenaxUSA.com [online], "Tenax CNC and Frankfurt Brush Finish Kit," May 13, 2013, retrieved on May 18, 2022, retrieved from URL<http://https://tenaxusa.wordpress.com/tag/leather-finish/>, 7 pages.
Vadaraquartz.com [online], "Vadara Collections", available on or before Sep. 20, 2020, via Internet Archive: Wayback Machine URL <http://web.archive.org/web/20200920181351/https://www.vadaraquartz.com/colors/> retrieved on Sep. 7, 2021, URL , <https://www.vadaraquartz.com/colors/> ,16 pages.
Yip, "Design innovations change the game in kitchen renovations", The Washington Post, Apr. 18, 2014, Exhibit I, Cosentino Exhibit No. 1020 in Cases IPR2021-00214, IPR2021-00215, IPR2021-00216, and PGR2021-00010, 4 pages, filing date Nov. 24, 2020.
Multi-HousingNews.com, [online] "Silestone Launches Volcano Texture Surfaces," MultiHousingNews.com, Dec. 20, 2010, 9 pages.
Silestone.com [online], "Silestone Textures Quartz Countertops," available on or before Oct. 1, 2011, via Internet Archive: Wayback Machine URL<http://web.archive.org/web/20111001032733/http://www.silestoneusa.com/quartz/silestone-textures.cfm>, retrieved on Feb. 9, 2023, URL<http://www.silestoneusa.com/quartz/silestone-textures.cfm>, 2 pages.
International Preliminary Report on Patentability in International Appln. No. PCT/US2022/029284, mailed on Nov. 23, 2023, 7 pages.
International Search Report and Written Opinion in International Appln. No. PCT/US2022/029284, mailed on Sep. 27, 2022, 10 pages.
Invitation to Pay Additional Fees and, Where Applicable, Protest Fee in International Appln. No. PCT/US2022/029284, mailed on Jul. 22, 2022, 2 pages.

* cited by examiner

TEXTURED STONE SLABS, SYSTEMS, AND METHODS

CROSS-REFERENCE TO RELATED APPLICATIONS

This application claims priority to U.S. application Ser. No. 63/188,403, filed on May 13, 2021. The disclosure of the prior application is considered part of the disclosure of this application, and is incorporated in its entirety into this application.

TECHNICAL FIELD

This document describes stone slab products, and systems and processes for surface treatment of stone slab products, for example, stone slabs suitable for use in living or working spaces (e.g., along a countertop, table, floor, or the like) and having multiple regions of different particulate mineral mixes with differing surface characteristics.

BACKGROUND

Stone slabs are a commonly used building material. Granite, marble, soapstone, and other quarried stones are often selected for use as countertops due to their aesthetic properties. Stone slabs may also be formed from a combination natural and other materials that can provide improved stain-resistant or heat-resistant properties, aesthetic characteristics, reproducibility, etc. Some stone slabs have been made from a combination of particulate mineral material and binder, such as a polymer resin or cement, and have a colored or veined pattern.

SUMMARY

Some embodiments described herein include systems and processes for forming stone slabs suitable for use in living or working spaces. In some optional embodiments, slabs can be manufactured by forming a cured and hardened slab, and then abrading one or more faces of the slab to reveal a tactile or visible texture that varies in relation to the composition of particulate mineral mixes of the slab. In some embodiments, a stone slab includes multiple regions of different particulate mineral mixes that have different tactile characteristics, such as different thickness, roughness, gloss, etc.

In an example embodiment, a processed slab is formed from a plurality of particulate mineral mixes, and includes a slab width that is at least 2 feet, a slab length that extends perpendicular to the slab width and that is at least 6 feet, the slab length and the slab width defining a top major surface, a slab thickness that extends perpendicular to the slab width and the slab length, the slab length greater than the slab width, the slab width greater than the slab thickness, and a first pattern defined by a first particulate mineral mix, the first pattern exposed along the top major surface of the slab, and defining a first thickness that extends perpendicular to the slab width and the slab length, and a second pattern defined by a second particulate mineral mix different from the first particulate mineral mix, the second pattern exposed along the top major surface of the slab and defining a second thickness that extends perpendicular to the slab width and the slab length, the first thickness of the first pattern different than the second thickness of the second pattern.

Various embodiments can include some, all, or none of the following features. The first pattern can be exposed along a bottom major surface of the slab. The first pattern exposed along the top major surface of the slab can have a first texture based on the first particulate mineral mix, and the second pattern exposed along the top major surface of the slab can have a second texture, different from the first texture, based on the second particulate mineral mix. The first texture can have a first roughness and the second texture has a second roughness that is different from the first roughness. The first pattern can have a first average gloss value and the second pattern can have a second average gloss value that is different from the first average gloss value. The first pattern can have a first average thickness perpendicular to the slab width and the slab length, and the second pattern can have a second average thickness perpendicular to the slab width and the slab length, and wherein the first average thickness is different from the second average thickness.

In an example implementation, a process of forming a processed slab from a plurality of different particulate mineral mixes includes dispensing a first particulate mineral mix to a first set of regions of a slab mold, dispensing a second particulate mineral mix to a second set of regions of the slab mold, contemporaneously vibrating and compacting the first particulate mineral mix and the second particulate mineral mix arranged in the slab mold so as to form a processed molded slab that is generally rectangular and has a slab thickness and a major surface having a slab width of at least 2 feet and a slab length of at least 6 feet, curing the processed molded slab into a cured slab, and abrading the major surface of the cured slab at locations of the first particulate mineral mix and the second particulate mineral mix with an abrading head to partly remove portions of the major surface such that the first particulate mineral mix in the first set of regions define a first thickness perpendicular to the slab width and the slab length, and the second particulate mineral mix in the second set of regions define a second thickness perpendicular to the slab width and the slab length.

Various implementations can include some, all, or none of the following features. The first particulate mineral mix can have a first hardness in the cured slab and the second particulate mineral mix can have a second hardness different from the first hardness in the cured slab. Abrading a portion of the major surface of the cured slab can include removing an amount of the major surface in the first set of regions to a first average thickness perpendicular to the slab width and the slab length that is different from a second average thickness removed from the second set of regions, wherein a first texture is based on the first average thickness and a second texture is based on the second average thickness. The first particulate mineral mix can include a first percent volume of quartz, and the second particulate mineral mix can include a second percent volume of quartz that is less than the first percent volume of quartz. One of the first set of regions and the second set of regions can define a majority of the major surface, and the other of the first set of regions and the second set of regions can define a vein extending at least partly across the major surface. Abrading the major surface of the cured slab can include abrading substantially an entirety of the major surface. Abrading the major surface of the cured slab can include abrading using an abrasive brush. The first set of regions can have a first texture and the second set of regions can have a second texture different from the first texture. The first texture can have a first roughness and the second texture can have a second roughness that is different from the first roughness. The first set of regions can have a first average gloss value and the second set of regions can have a second average gloss value that is different from the first average gloss value. The first set of regions can have a first average thickness perpendicular to the slab width and the slab length, and the second set of regions can have a second average thickness perpendicular to the slab width and the slab length, and wherein the first average thickness is different from the second average thickness. Abrading the major surface can include passing a sequence of different abrading brushes having different abrasive grits over the entirety of the major surface. Abrading the major surface can include passing the abrading head over the entire major surface with consistent operating parameters. Abrading the major surface can include passing a second abrading head over the entire major surface with consistent operating parameters.

The systems and techniques described here may provide one or more of the following advantages. First, a system can provide stone slab products that have a tactile and/or visible texture. Second, the system can provide stone slab products that have a texture that resembles that of quarried stone. Third, the system can provide stone slab products that have an aesthetic appeal similar to that of quarried stone and with improved performance benefits such as heat and stain resistance and reproducibility, but without the cost and/or environmental impact associated with stone quarrying. Fourth, the system can modify existing stone slab products to provide additional product options from a common base product.

The details of one or more implementations are set forth in the accompanying drawings and the description below. Other features and advantages will be apparent from the description and drawings, and from the claims.

DETAILED DESCRIPTION

In general, this document describes systems and techniques in which processed stone slabs having textured faces can be manufactured by abrading a cured (e.g., hardened) slab having exposed regions of different component materials that abrade or erode differently (e.g., at different rates when subjected to a common treatment), and/or otherwise reveal different textures due to the abrasion. For example, hardened materials are worn down in different manners to produce one or more different surface characteristics based on the component materials (e.g., and in an example embodiment does not include imparting a pattern into soft, uncured materials and then allowing the pattern to harden). In some embodiments, an example stone slab includes varying texture that caricatures natural erosion and fissuring and/or provides different characteristics that create a predetermined aesthetic and tactile characteristics.

Figure 1:
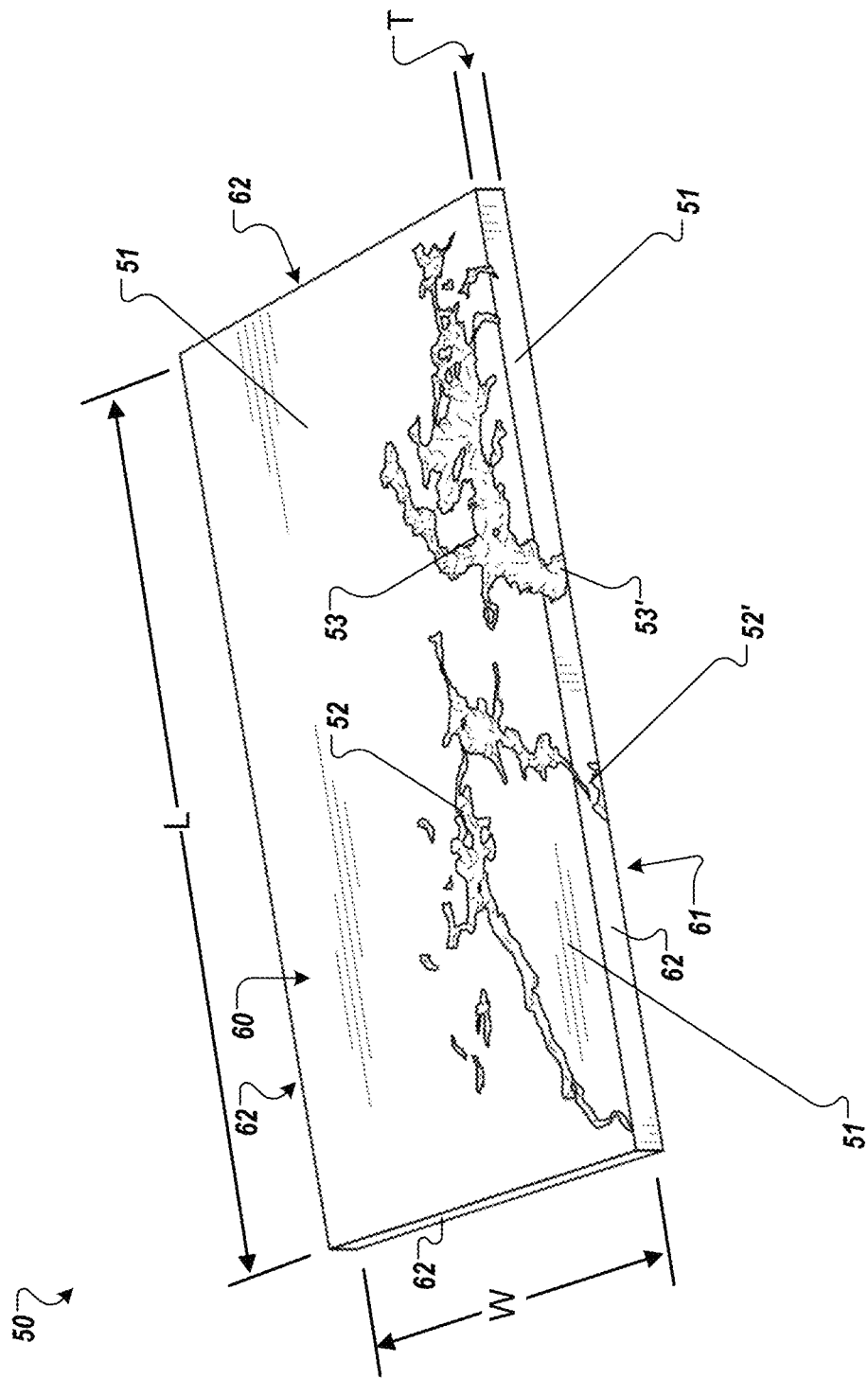
FIG. 1 is a perspective view of an example processed slab, in accordance with some embodiments.

Referring to FIG. 1, an example processed slab 50 is shown having a first region 51 of a primary or background fill and second and third regions 52, 53 that include striations or veins (e.g., according to a predefined pattern). One or more of a top major surface 60, a bottom major surface 61, and/or edges 62 have a tactile and/or visible texture. For example, the primary fill 51, region 52, and/or region 53 have surface features that differ in one or more respects. In an example embodiment, the regions 52 and 53 are recessed below or raised above the average thickness of the processed slab. Alternatively or additionally, the regions 52 and 53 have a surface characteristics or texture that differs compared to primary or background fill 51, such as a different roughness (or smoothness), gloss, or other tactilely perceptible difference.

In various example embodiments, slab 50 includes any number, combination, pattern, and/or proportion of particulate fills and mixes. For example, the processed slab 50 can include two, three, four, five, ten, or any appropriate number of particulate mineral mixes to provide any appropriate number of regions (e.g., different perceptible patterns/veins). In another example, the primary fill 51 may not occupy a majority of the processed slab 50 (e.g., the processed slab 50 may include a substantially continuous collection of regions without any one of the particulate fill types occupying an identifiably primary or major portion of the volume of the processed slab 50). In some embodiments, processed slab 50 includes one or more regions 51, 52, 53 of different particulate mineral mixes and/or different surface characteristics (e.g., according to a predefined pattern).

The processed slab 50 has a width W and a length L (e.g., at least 2 feet wide by at least 6 feet long, and between about 3 feet and 5 feet wide and between about 6 feet and 14 feet long, preferably about 4.5 feet wide (more particularly, about 140 cm wide) by about 10 feet long (more particularly, about, 310 cm long)). In general, the length L and the width W define a top major surface 60 (e.g., face) and a bottom major surface (e.g., face) 61. The processed slab 50 also has a thickness T between the top major surface 60 and the bottom major surface 61. The periphery of the processed slab 50 includes a collection of edge faces 62.

Each slab 50 can comprise a quartz material and/or other particulate mineral material that, when mixed with pigments and a resin binder and subsequently compressed and cured, provides a hardened slab product suitable for use in living or working spaces (e.g., along a countertop, table, floor, or the like). As shown in FIG. 1, each slab 50 may be formed from a combination particulate mineral mixes that have different hardnesses and/or resistances to abrasion, and optionally different colors and textures. The particulate mineral mixes are arranged in a slab mold (e.g., slab mold 530 shown in FIG. 5), to provide the predetermined regions of selected striations/veins and/or other patterns. In some embodiments, the patterns may be generally repeatable for each separately molded slab, for example by dispensing different particulate mineral mixes (e.g., different hardnesses, different resistance to abrasion, different pigments, different mineral compositions, different additives) according to predefined and repeatable dispensation pattern into the mold until filled. The mold is closed and then transported for compaction, curing, abrading, and other operations.

As shown in FIG. 1, the pattern of regions 51, 52, and 53 provide a surface appearance having one or more veins or other visible features. In some embodiments, veins 52 and 53 extend at least partly across the major surfaces 60, 61 and/or the edges 62 (the thickness T). For example, slab 50 can include a widthwise vein that extends partly or entirely in a generally widthwise direction, a lengthwise vein that extends partly or entirely in a generally lengthwise direction. Alternatively or additionally, one or more veins extend in angled or varying directions partly or entirely across the length L and/or width W of the processed slab 50. In some embodiments, the veins also extend partly (such as vein 52') or entirely (such as vein 53') through the thickness of the processed slab 50 (e.g., thereby providing a vein appearance even when the slab is cut and edged to specific shapes in living or working space, such as along a countertop, table, floor, or the like). In some embodiments, each processed slab 50 in a set of separately molded slabs can include the regions of different particulate mineral mixes dispensed into the mold (e.g., such as mold 530 shown in FIG. 5) according to predefined and repeatable dispensation patterns, such that multiple slabs 50 in the set of separately molded slabs can have substantially the same appearance to one another.

The different mixes can be compaction molded and cured in the mold so as to provide the hardened slab 50. One or more of the mixes that are used to form the composite stone material can include organic polymer(s) and inorganic (mineral) particulate component. The inorganic (mineral) particulate component may include such components as silicon, basalt, glass, diamond, rocks, pebbles, shells, a variety of quartz containing materials, such as, for example, but not limited to: crushed quartz, sand, quartz particles, and the like, or any combination thereof. In this embodiment, all four different particulate mineral mixes each comprise a quartz material as a predominant component, which may include sand of various particle sizes and of different combinations. In the hardened, cured form of the slab 50, the organic and inorganic materials can be linked using a binder, which may include for example, mono-functional or multi-functional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof. Some or all of the mixes dispensed in the mold may include components that are combined in a mixing apparatus prior to being conveyed to the mold. The mixing apparatus can be used to blend raw material (such as the quartz material, organic polymers, unsaturated polymers, and the like) at various ratios. For example, some or all of the mixes dispensed in the mold 530 may include about 8-95% quartz aggregates to about 5-15% polymer resins. In addition, various additives may be added to the raw materials in the mixing apparatus, such additives may include metallic pieces (e.g., copper flecks or the like), colorants, dyes, pigments, chemical reagents, antimicrobial substances, fungicidal agents, and the like, or any combination thereof. In alternative embodiments, some or all of the quantity of quartz aggregates (mentioned above) can be replaced with or include porcelain and/or ceramic aggregate material.

The regions 51, 52, and 53 each have a different hardness and/or resistivity to abrasion when cured and hardened. In some embodiments, the differences in hardness and/or resistivity to abrasion can be due to differences in the properties and characteristics of the different particulate mineral mixes used in the formation of the slab 50, including particulate composition (e.g., quartz content, other mineral content, particulate size), binder content, pigment content, average particle size, average particle hardness, and/or average particle brittleness. In various example embodiments, one or more of the particulate mineral mixes has relatively higher percent volume of quartz compared to one or more of the other particulate mineral mixes. For example, the first particulate mineral mix (e.g., locations of primary fill 51) has a percent volume of quartz (Q1) between 50% and 95%, 65% and 85%, or about 75%. The second particulate mineral mix (e.g., locations of veins 52 and 53) has a percent volume of quartz (Q2) that is less than the percent volume of quartz of the first particulate mineral mix. In various example embodiments, Q2 is between 40% and 95%, 60% and 90%, or about 80% of Q1. Alternatively or additionally, other components of the particulate mineral mix can be controlled to provide different characteristics of the respective mineral mixes in the hardened slab. For example, in some embodiments, the first particulate mineral mix includes between 70% and 80% volume of quartz, between 0% to 10% volume of pigment, and between 10% and 20% volume resin binder. The second particulate mineral mix includes between 50% and 70% volume of quartz, between 10% and 30% volume pigment, and between 5% and 30% resin binder. In some embodiments, one or more pigmentation layers may be applied over and/or between the particulate mineral mixes. For example, some pigmentation layers may include relatively low volumes of quartz (e.g., between 5% and 30%) and relatively high volumes of pigment (e.g., between 10% and 30%) and/or resin binder (e.g., between 50% and 70%). Such relative compositions of first and second particulate mineral mixes facilitate different response to abrasion operations that facilitates a finished surface having regions of distinct texture, gloss, thickness, and/or other perceptible surface characteristics associated with locations of the respective particulate mineral mixes. In some embodiments, various mineral particulate components are included, such silicon, basalt, glass, diamond, rocks, pebbles, shells, a variety of quartz containing materials, such as, for example, but not limited to: crushed quartz, sand, quartz particles, and the like, or any combination thereof, to facilitate a predetermined response to abrasion operations.

In some embodiments, the regions 51 can define a majority of the major surface 60, and regions 52 and 53 can define one or more veins extending at least partly across the major surface 60. For example, the primary fill can occupy the regions 51 within the slab 50, and other particulate mineral mixes form the regions 52 and 53, which extend partly or entirely across the surfaces and edges of the slab 50.

In some implementations, substantially the entire major surface 60 can be abraded substantially uniformly. For example, the same type and duration of abrasion can be applied across the entire major surface 60 (e.g., causing substantially all of the primary fill exposed at the major surface 60 in the regions 51 to erode to substantially the same average depth, and causing the regions 52 and 53 to each erode to their own respective average depths across the entire major surface 60).

In some implementations, the first set of regions can have a first texture and the second set of regions can have a second texture different from the first texture. For example, the region 51 may have a smooth, glossy texture, while the regions 52 and/or 53 may have a relatively rougher, matte texture.

Figure 2:
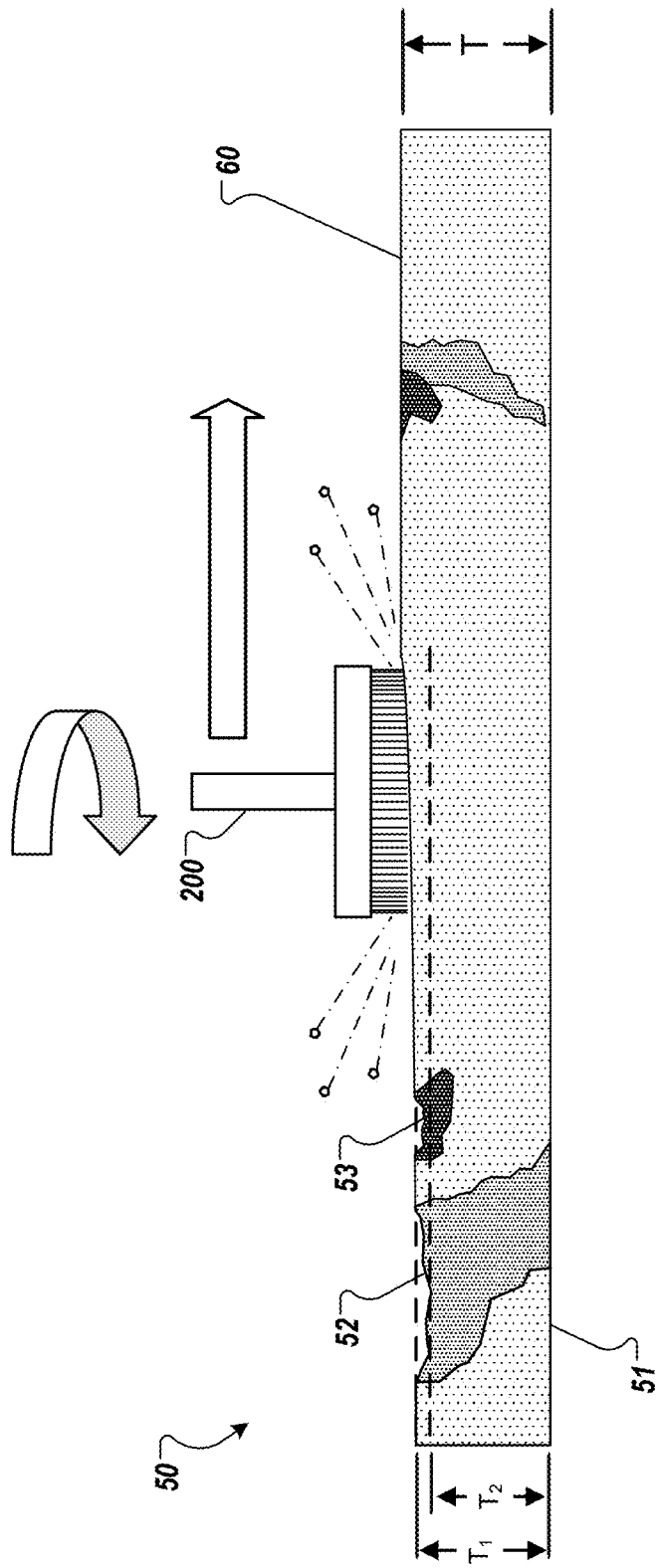
FIG. 2 is a side view of an example processed slab undergoing an example surface treatment process, in accordance with some embodiments.

FIG. 2 is a side view of the processed slab 50 undergoing an example surface treatment process. An abrasive brush 200 abrades substantially all of the top major surface 60 of the processed slab 50 to expose a processed face. For example, the abrasive brush 200 applies the same abrasion (e.g., same abrasion parameters) over the entire top major surface 60 without distinction between regions of different particulate mineral mixes (e.g., regions 51, 52, 53). As the abrasive brush 200 is rotated and drawn across the top major surface 60, a small amount of the processed slab 50 at the top major surface 60 is removed.

The primary fill 51, the veins 52, and the veins 53 are formed from different mineral particulate mixes having different physical characteristics, such as different cured hardnesses, textures, and/or resistances to abrasion in the processed slab 50. As such, the primary fill 51, and the veins 52 and 53 define different regions of different cured harnesses, textures, or resistances to abrasion across the top major surface 60. When subjected to abrasion by the abrasive brush 200, the primary fill 51, the vein 52, and the vein 53 erode or otherwise react to the abrasion at relatively different rates and/or in different manners.

In an example embodiment, the veins 52 and 53 are relatively susceptible to the abrasion of brush 200 and relatively more material is removed at locations of veins 52 and 53 as compared to region 51 (e.g., during each pass of brush 200 and/or over the course of an entire abrading operation). For example, the vein 52 erodes to an average thickness $T_2$ and the primary fill 51 erodes to an average thickness $T_1$. In some embodiments, the major fill 51 can be relatively less resistant to abrasion than the veins 52, 53, to provide a substantially inverse effect (e.g., with the primary fill having an average thickness $T_2$ and the veins 52, 53 having an average thickness $T_1$). As such, after abrasion, the major top face 60 has a thickness that varies between locations of primary fill 51 and veins 52 and 53 (e.g., relative to an average thickness of the processed slab), and includes peaks, valleys, and plateaus that can be felt and/or seen. In some embodiments, the resulting texture can have a matte finish appearance and/or texture, a gloss finish appearance and/or texture, or combinations of both (e.g., a primarily glossy surface with matte textured veins running across it).

In some implementations, abrading the major surface 60 of the cured slab 50 can include abrading by at least one of an abrasive brush and mechanical application of an abrasive fluid compound. For example, the example abrasion brush 200 can be used to apply a fluid compound containing abrasive material to the major surface 60.

In some implementations, each of the textures can be defined by one or more of roughness, gloss, and average thickness extending perpendicular to the slab width and the slab length. For example, the region 51 and the regions 52, 53 can each be made up of mineral particulate mixes that each have particles that are more rounded or more faceted in shape, or have particulates or binders that have relatively different in terms of light absorption and reflectivity, or exhibit relatively different levels of receptivity to polishing. In another example, as described above, the texture can be defined by some areas having different thicknesses than others (e.g., the example veins 52, 53 have an example thickness of T2 whereas the example primary fill has an example thickness of T1, resulting in boundaries where the transitions between the different thicknesses can be felt or seen).

Figure 3A:
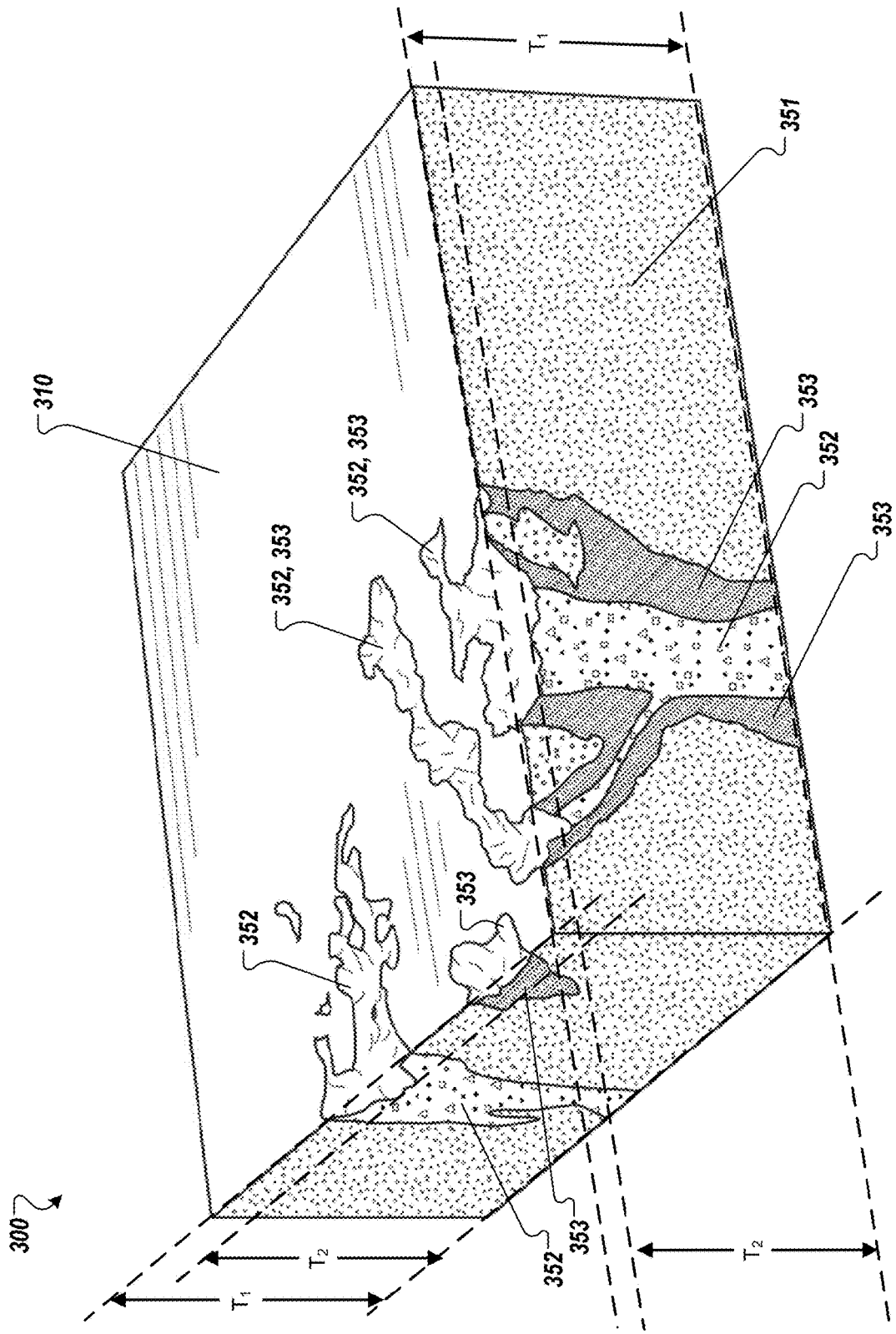
FIGS. 3A and 3B are enlarged sectional perspective views of example processed slabs, in accordance with some embodiments.
Figure 3B:
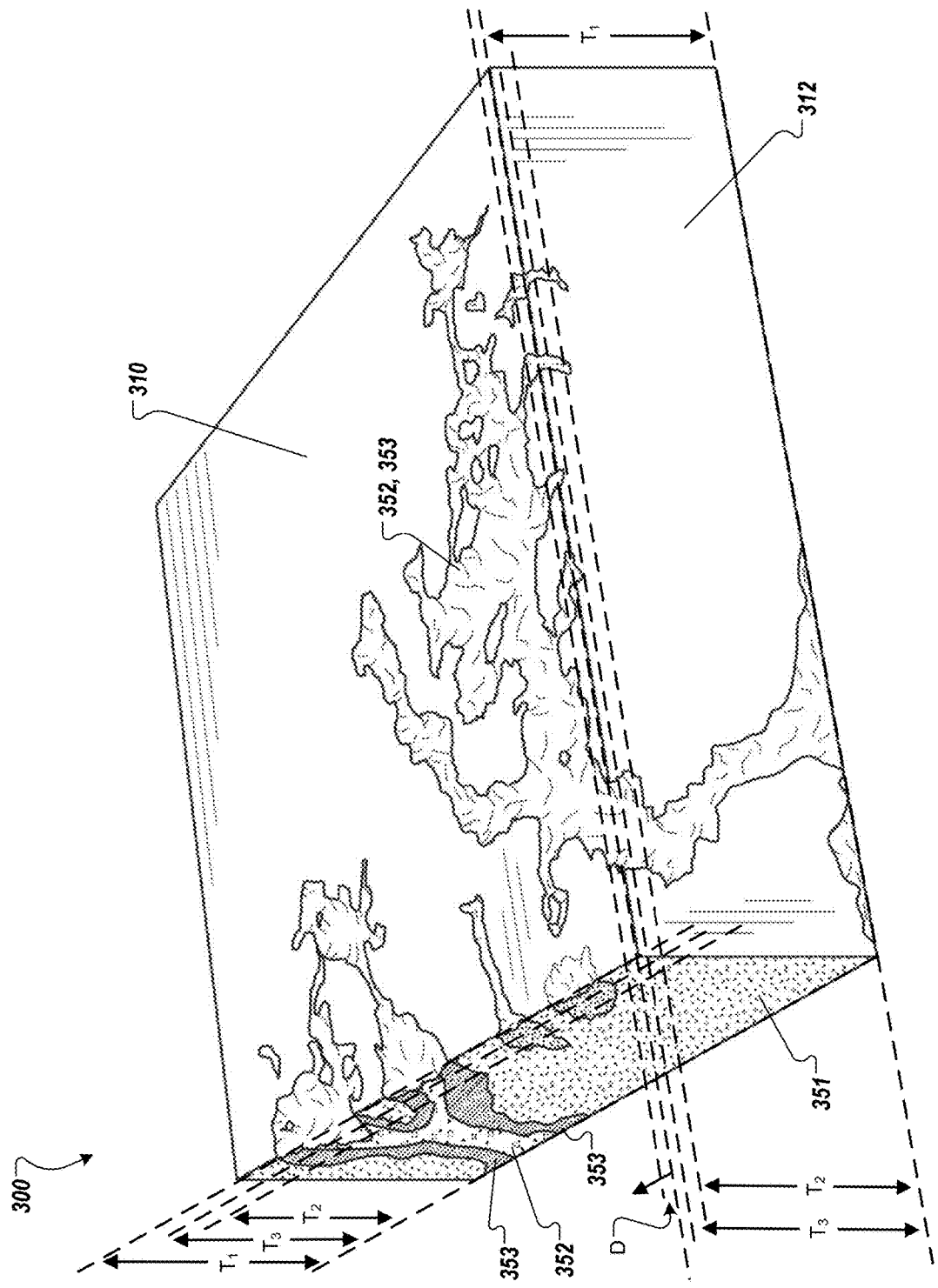

FIGS. 3A and 3B are enlarged sectional perspective views of example processed slabs. In various example embodiments, slab 300 may include one or more features of slab 50 described above with reference to FIGS. 1 and 2.

The slab 300 has a major surface (or face) 310 that is generally defined by an average thickness $T_1$ of a primary fill 351 (e.g., a particulate mix that makes up a majority of the volume of the slab 300). A collection of veins 352 and a collection of veins 353 extend partly and/or entirely across the major surface 310 and/or through the thickness of the slab 300. The veins 352 are recessed below the major surface 310 to an average thickness $T_2$, and the veins 353 are be recessed below the major surface 310 to an average thickness $T_3$ that is different from $T_1$ and/or $T_2$. The difference between the thicknesses $T_1$ and $T_2$ provide the major surface 310 with a three-dimensional texture that can be felt and/or seen. In various example embodiments, the difference between $T_1$ and $T_2$ is in a range between 0.01 mm and 10 mm, 0.1 mm and 2 mm, or about 0.5 mm. In some embodiments, the rear major surface of slab 300 is substantially flat across primary fill 351, and veins 352 and 353, and an average depth of the veins 352, 353 below the major surface 310 is approximately equal to the difference between $T_1$ and $T_2$.

In the illustrated example, the veins 352 and 353 are made of two different particulate mineral mixes in addition to the primary fill 351, such that the slab 300 include first, second, and third particulate mineral mixes that each differ in one or more characteristics. Alternatively or additionally, slab 300 may include two, three, or more than three particulate mineral mixes that each differ in one or more characteristics.

Referring to FIG. 3B, the slab 300 is shown with an exposed edge face 312 (e.g., a side edge defined by the thickness of the slab 300 visible in the finished slab 300). Some of the veins 352, 353 extend along the major surface 310 and are visible over the corner of the slab 300 to extend at least partly along the exposed edge face 312. The veins 352, 353 at the edge face 312 are recessed to an average depth D away from the edge face 312, providing the edge face 312 with a three-dimensional texture that can be felt and/or seen.

Figure 4:
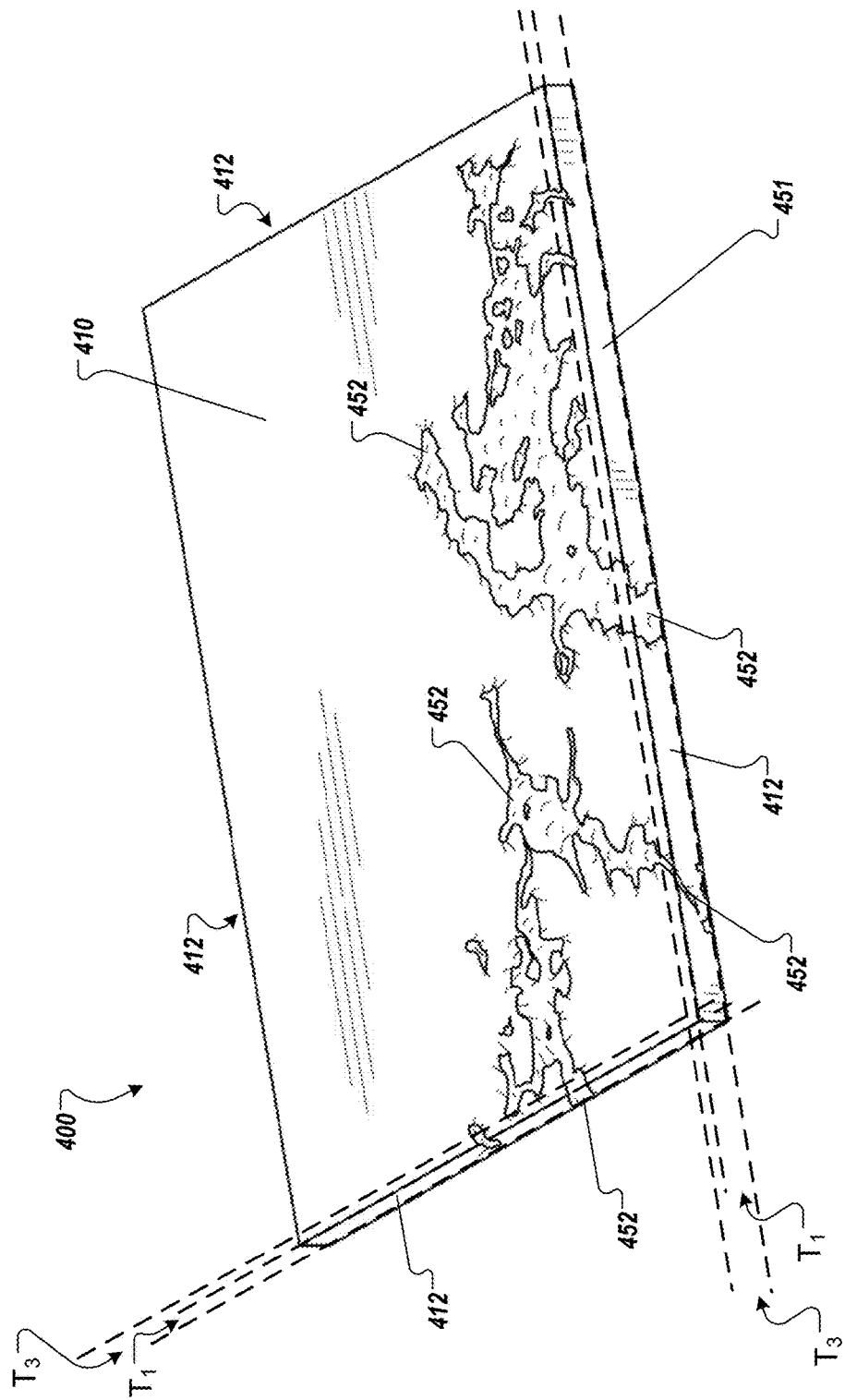
FIG. 4 is an enlarged perspective view of an example processed slab, in accordance with some embodiments.

FIG. 4 is an enlarged perspective view of an example processed slab 400. In various example embodiments, processed slab 400 may include one or more features of slabs 50 and 300 described above with reference to FIGS. 1-3B. The slab 400 has a major surface (or face) 410 that is generally defined by an average thickness $T_1$ of a primary fill 451 (e.g., a particulate mix that makes up a majority of the volume of the slab 400). A collection of regions 452 (e.g., veins) extend partly and/or entirely across the major surface 410 and edge faces 412 of the slab 400. The regions 452 project outward from the major surface 410 and the edge face 412 to an average thickness $T_3$. The difference between the thicknesses $T_1$ and $T_3$ provide the major surface 410 and the edge faces 412 with three-dimensional textures that can be felt and/or seen. The regions 452 are made of at least one particulate mineral mix that differs from the particulate mineral mix of primary fill 451.

Figure 5:
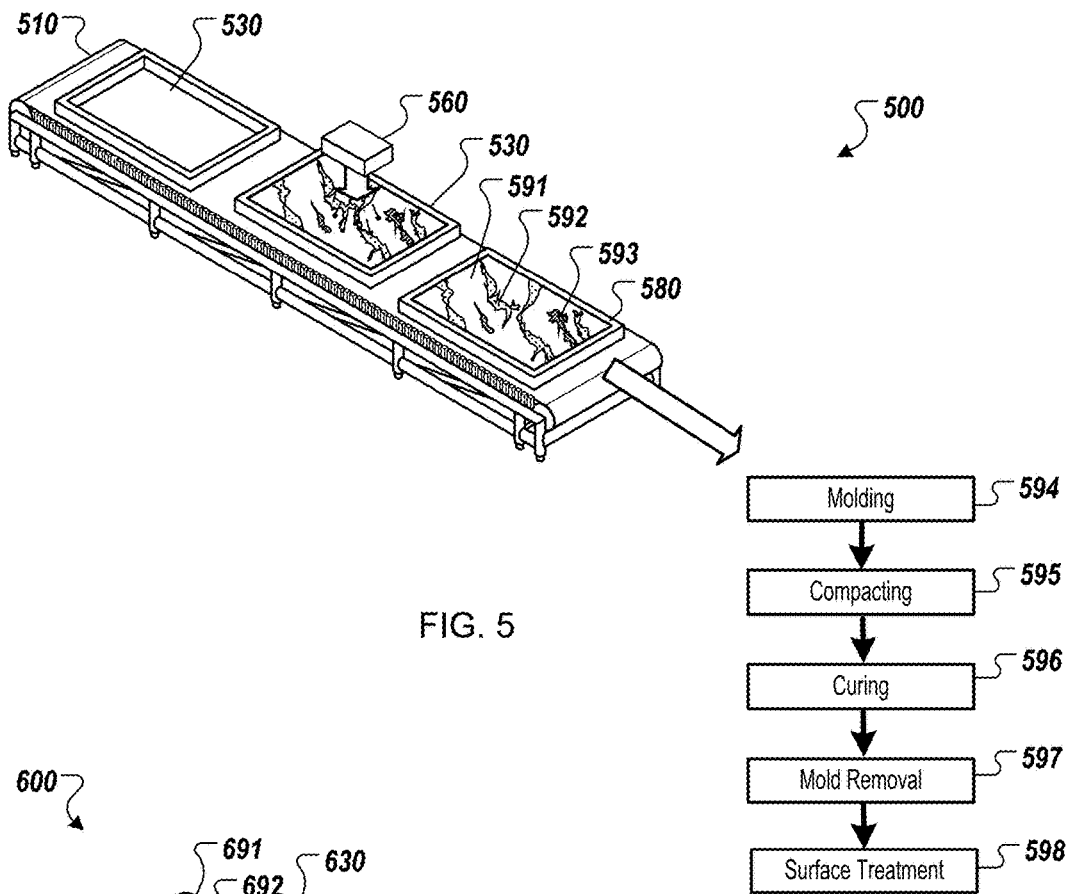
FIG. 5 is a diagram of an example system for forming a processed slab product, in accordance with some embodiments.

Referring now to FIG. 5, a diagram of an example system 500 for forming a processed slab product is shown. In some embodiments, the system 500 for forming a set of processed slab products (e.g., slabs 50, 300, 400 in FIGS. 1-4) is configured to dispense particulate mineral mixes (e.g., that are differently resistant to abrasion when formed into the cured slab) into the slab molds 530. The slab molds 530 are then advanced to a subsequent compression molding operation (e.g., vibro-compaction molding, curing, etc.). The system 500 includes a conveyor 510. A collection of slab molds 530 are transported on the conveyor 510. The slab molds 530 provide a form for processed molded slab products that are at least three feet wide and at least six feet long, and about 4.5 feet wide by about 10 feet long, for example.

The conveyor 510 transports the slab molds 530 to a dispenser 560 (e.g., a mineral aggregate distributor). In the illustrated example, the dispenser 560 is configured to release different particulate mineral mixes (e.g., different cured resistances to abrasion, different textures, different pigments, different mineral compositions, different additives, or a combination thereof). In some embodiments, multiple dispensers 560 may be used (e.g., each dispenser configured to dispense different particulate mineral mix or combination of mixes).

The slab mold 530 receives the different mineral mixes (comprising mostly a quartz material as described above) from the dispenser(s) 560. For example, the dispenser 560 can be configured with a shutter or valve apparatus that is controllable to regulate the flow of particulate mineral mix from the dispenser 560 for input to the slab mold 530. In some embodiments, the dispensing heads (or other inputs for distributing the particulate mineral mixes to the slab mold 530) can be controlled according to a predetermined control algorithm so as to define successive layers or regions of the different particulate mineral mixes for dispensation into the slab mold 530. In the illustrated example, the slab mold 530 is filled with a primary fill 591 and two other different types of particulate mineral mixes to create two different types of patterns such as a vein 592 and a vein 593.

In some examples, multiple dispensers 560 can be used to dispense different particulate mixes into different regions of the slab. The slab may be formed from a number of different particulate mineral mixes, such as between 2 and 20 different particulate mineral mixes (e.g., and the system includes a corresponding number of dispensers 560 or a single dispenser 560). In some examples, the number of dispensers 560 can correspond equally to the number of differently pigmented particulate mineral mixes used to create the slab product.

The filled molds 580 are then moved to one or more sequent stations in the system 500 for forming the hardened slab. For example, each of the filled molds 580 can continue to a subsequent station in which a top mold attachment 594 is positioned over the filled mold 580 so as to encase the layers of particulate mineral mixes between the slab mold 530 and a top cover mold piece. From there, the filled mold 580 (e.g., including the top cover mold piece) advances to a subsequent station in which a vibro-compaction press 595 applies compaction pressure, vibration, and/or vacuum to the contents inside the filled mold 580, converting the particulate mixes into a rigid slab. The filled mold is subjected to a curing station 596 in which the material used to form the slab (including any resin binder material) are cured via a heating process or other curing process, strengthening the slab inside the filled mold 580. After the slab is fully cured (and, optionally, after the slab is cooled), the slab mold 530 and the top mold cover piece are removed from the hardened and cured slab at a mold removal station 597. The slab mold 530 is then returned to the conveyor 510. The hardened and cured slab is moved to a surface treatment station 598, in which a major surface of the slab is abraded, to reveal a complex abraded surface having a predetermined texture and pattern. In some embodiments of the system 500, the abraded or otherwise exposed major surface of each of the processed molded slabs can provide an outer appearance that is substantially repeatable for the other slabs (from the other filled molds 580 in FIG. 5).

Figure 6:
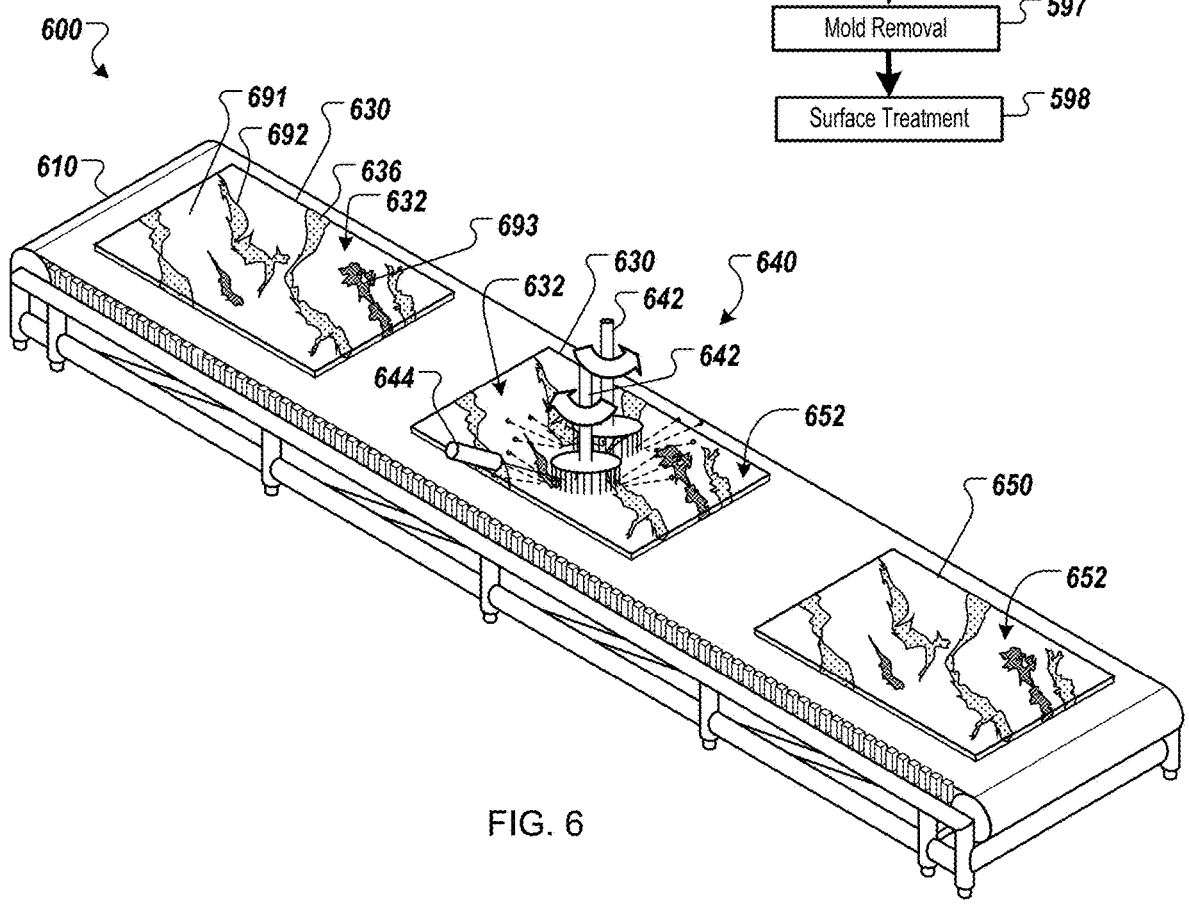
FIG. 6 is a diagram of an example system for applying a surface treatment to texturize a processed slab product, in accordance with some embodiments.

FIG. 6 is a diagram of an example system 600 for applying a surface treatment to texturize a processed slab product (e.g., a face treatment apparatus), in accordance with some embodiments. In some embodiments, the system 600 is included in the example surface treatment station 598 of FIG. 5. The system 600 is configured to modify at least a portion of at least one face of a cured and hardened processed stone slab by abrading the slab to reveal visible and/or tactile differences in the depth and/or roughness of different materials exposed at the processed face(s).

A collection of hardened and cured slabs 630 (e.g., the hardened and cured slabs removed at the example mold removal station 597) are transported on a conveyor 610 to a surface treatment station 640. The hardened and cured slabs 630 include a primary fill 691 (e.g. the primary fill 51 of the example slab 50, the primary fill 591 after it has been cured and hardened, etc.), and/or one or more regions 692 and 693. In an example embodiment, the primary fill 691 is made of a first particulate mineral mix that differs in one or more characteristics as compared to second and third particulate mineral mixes 692, 693. For example, the hardness, brittleness, resistance to abrasion, and/or other characteristics differs between the first particulate mineral mix compared to the second and/or third particulate mineral mix.

The surface treatment station 640 modifies a major surface 632 of the hardened and cured slabs 630. For example, the surface treatment station 640 includes one or more abrasive brushes 642 configured to contact the major surface 632 vertically and rotate about a rotational axis arranged substantially perpendicular to the major surface 632. The one or more abrasive brushes 642 rotate in contact with the major surface 632 as they are drawn across the major surface to provide substantially the same amount (e.g., duration) of abrasion to all areas of the major surface 632. In an example embodiment, the movement of the one or more brushes 642 across the major surface 632 is independent of the region of the slab (e.g., independent of whether the brush is in contact with 691, 692, 693). One or more abrasive fluid compound applicators 644 can be used to apply abrasion promoters and/or water to the areas being treated to modify the action of the abrasive brushes 642, to control the temperature of the process, and/or to reduce the production of dust. The selection of brush type, vertical pressure, rotational speed, lateral direction, lateral pattern, abrasive grit, water flow, and slab advancement speed can all be controlled to further control the abrasion process. In some implementations, the abrasion process may be applied evenly to provide a uniform level of abrasion, or it may be applied unevenly across the major surface 632 to provide an intentionally non-uniform level of abrasion. In various example embodiments, the one or more abrasive brushes include silicon carbine, diamond, or other abrasive brushes such as diamond abrasive brushes available from Tenax USA of Charlotte, NC. In some embodiments, a series of brushes having differing abrasive grit ratings are used in sequence. In some embodiments, abrasive brush application pressures are between 0.5 bar to above 8.0 bar, between 0.8 bar to 4 bar. In some examples, the abrasive brushes 642 can be spun at speeds ranging from 200 RPM to 1500 RPM, 300 RPM to 1200 RPM, or between 400 RPM to 550 RPM. In some implementations, water is applied to the abrasion site at flow rates ranging from zero to 4 gallons per minute or more. In some embodiments, the abrasive brushes 642 are advanced across the major surface 632 at speeds ranging from below 9000 to above 18000.

As the abrasive brushes 642 abrade the major surface 632, small amounts of the major surface 632 are removed to provide a processed major surface 652 of a processed stone slab product 650. The particulate mineral mixes in regions 691, 692, 693, abrade at different rates and/or in different manners (e.g., based on different hardness, particle size, resistance to abrasion, etc.).

In some example embodiments, the primary fill 691 is harder and/or more abrasion-resistant than the veins 692, 693 such that the areas of the veins 692, 693 exposed at the major surface 632 (e.g., face areas) recede below a plane generally defined by the primary fill 691. The resulting processed slab has a slab thickness that varies (e.g., between regions 691, 692, 693), with the average thickness of the primary fill 691 (e.g., $T_1$ of FIG. 2) generally thicker than the average thickness of the veins 692, 693 (e.g., $T_2$ of FIG. 2). In some embodiments, the exposed surface can resemble the appearance of a topographical or relief map of a plain with valleys running through it.

In some example embodiments, the primary fill 691 is softer or less abrasion-resistant than the veins 692, 693, the areas of the major surface 632 exposed at the major surface 632 may recede below bumps and mounds made up of the veins 692, 693. For example, the exposed surface can resemble the appearance of a topographical or relief map of a plain with hills or mountain ranges rising from it.

In some example embodiments, the vein 692 is softer than the primary fill 691, and the vein 693 is harder than the primary fill 691. The resulting texture of the major surface has features that are both raised (e.g., vein 693) and recessed (e.g., vein 693) relative to the average thickness. The processed major surface 652 has a texture that can be seen and/or felt due to the differences in average slab thicknesses in regions of the primary fill 691, the vein 692, and the vein 693.

In some embodiments, the processed stone slab product 650 produced by the example system 600 can be the example processed slabs 50, 300, 400, of FIGS. 1-5. In some implementations, the processed stone slab product 650 may be further processed. For example, the major surface 652 may be polished to round or blunt sharp peaks, or the peaks may be polished or flattened to define flattened raised regions resembling plateaus.

In some example embodiments, the system 600 includes a calibration station arranged before or after the surface treatment station 640. For example, the major surfaces 632 of the cured slabs 630 can polished, planed, smoothed, and/or otherwise provided with a substantially even surface across the entire major surface 632 prior to being abraded. In another example, the processed major surfaces 652 of the cured slabs 630 can be partly polished, planed, smoothed, or otherwise modified to have a collection of plateaus that define a substantially common plane across the processed major surface 652. In some example embodiments, such steps may be omitted (e.g., the abrasion is performed on the major surface 632 in the form that exists after mold removal 597 without subjecting the slab to an intermediate planning or calibration operation).

Figure 7:
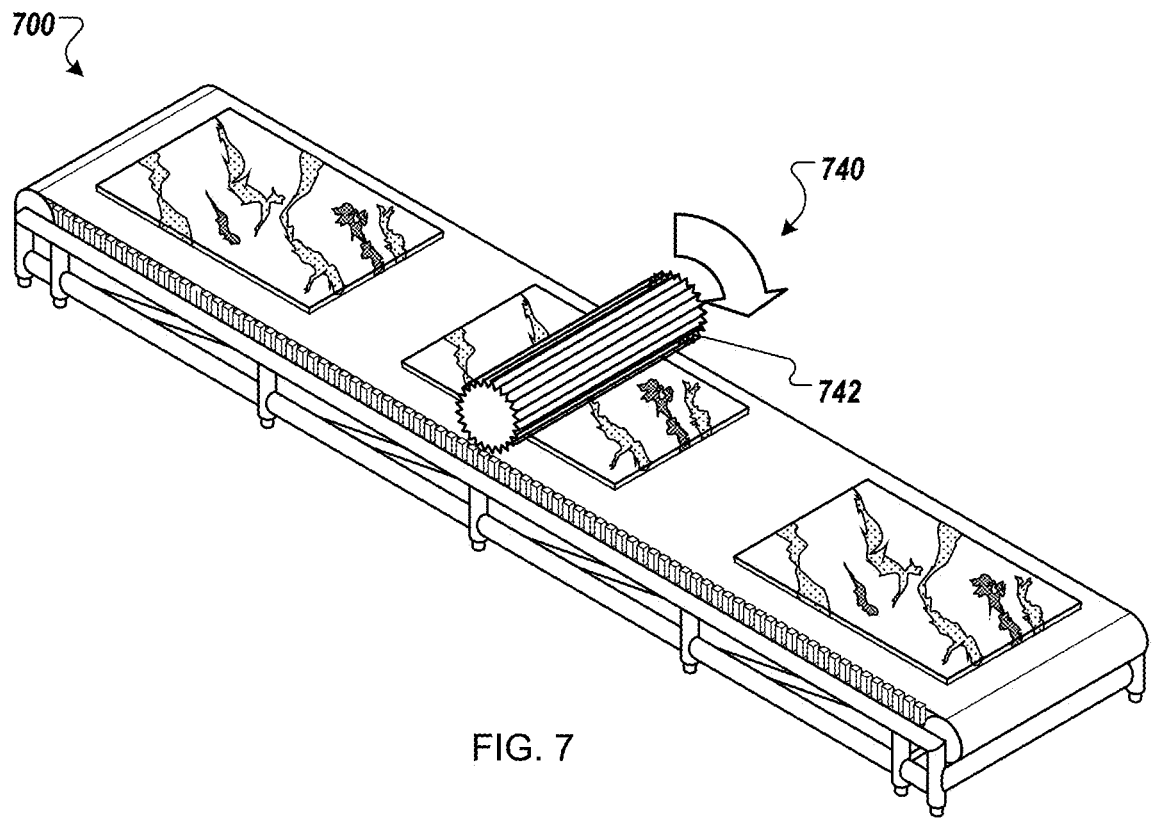
FIGS. 7-8 are diagrams of example systems for applying a surface treatment to texturize a processed slab product, in accordance with some embodiments.
Figure 8:
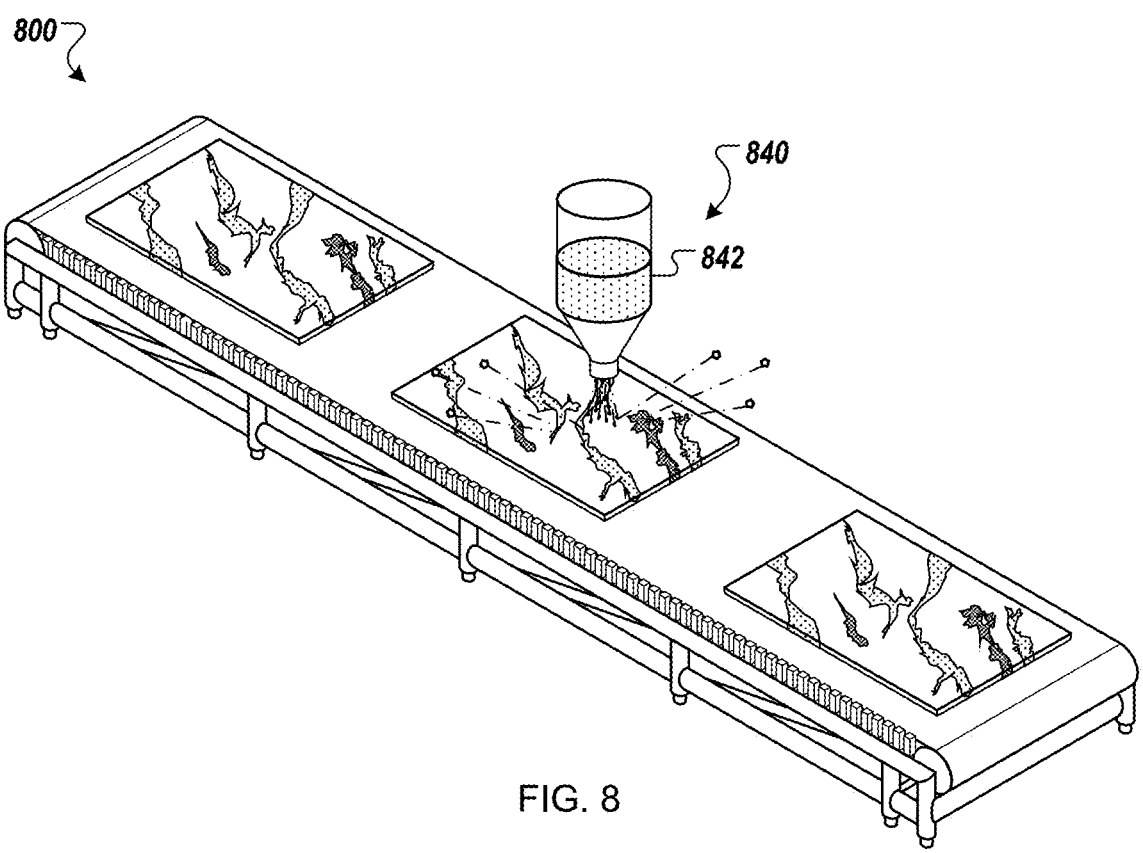

FIGS. 7-8 are diagrams of example systems 700 and 800 for applying a surface treatment to texturize a processed slab product. In some embodiments, the systems 700 and 800 are included in the example surface treatment station 598 (FIG. 5). In some example embodiments, the systems 700 and 800 include one or more features of the example system 600 described with reference to FIG. 6.

Referring to FIG. 7, the system 700 includes a surface treatment station 740. The surface treatment station 740 includes one or more cylindrical abrasion tools 742. In some embodiments, the tool 742 is an abrasive brush that contacts the surface being processed and rotates substantially perpendicular to the surface about an axis that is substantially parallel to the surface. In some embodiments, the tool 742 can resemble a planning head configured to grind against the surface. The different materials in different areas of the surface abrade differently from each other due to the differences in their respective particulate mineral mixes, leaving behind a processed surface with a tactile and/or visual texture. In an example embodiment, the movement of the tool 742 across the major surface of the slab is independent of the region of the slab (e.g., independent of whether the brush is in contact with a particulate mineral mix), such that the tool 742 is consistently applied across the entire major surface of the slab.

Referring to FIG. 8, the system 800 includes a surface treatment station 840. The surface treatment station 840 has a nozzle 842 configured to perform abrasive blasting (e.g., sandblasting). In the illustrated example, a stream of abrasive material is forcibly propelled against the surface. The different materials in different areas of the surface abrade differently from each other due to the differences in their respective particulate mineral mixes, leaving behind a processed surface with a tactile and/or visual texture. In an example embodiment, application of the abrasive blasting across the major surface of the slab is independent of the region of the slab, such that the abrasive blasting is consistently applied across the entire major surface of the slab.

In some embodiments, the example systems 600-800 may also use an abrasion promoter, such as an abrasive liquid or paste. In some embodiments, surface treatment stations may use a substantially non-abrasive brush or pad in combination with a paste, powder, or liquid that provides the abrasive properties. In some embodiments, surface treatment stations may use chemical etching, such as an acid or solvent for which the different materials in the slab react differently, to chemically etch the major surfaces of hardened and cured slabs. In some embodiments, surface treatment stations may use any appropriate combinations of the described tools, or any other appropriate tool or substance that can be used to abrade or erode the surface of a hardened and cured processed stone slab.

In some embodiments, the example systems 600-800 may be configured with one or multiple stages of abrasion using one or multiple different types of abrasives, abrasion tools, abrasion patterns (e.g., the abrasion tool can be draw across the surface in predetermined straight lines, curves, circles), application pressures, grits, speeds, directions across the major surfaces, speeds across the major surfaces, any combination of these and/or other appropriate variables that can affect the abrasion of processed stone slabs.

Figure 9:
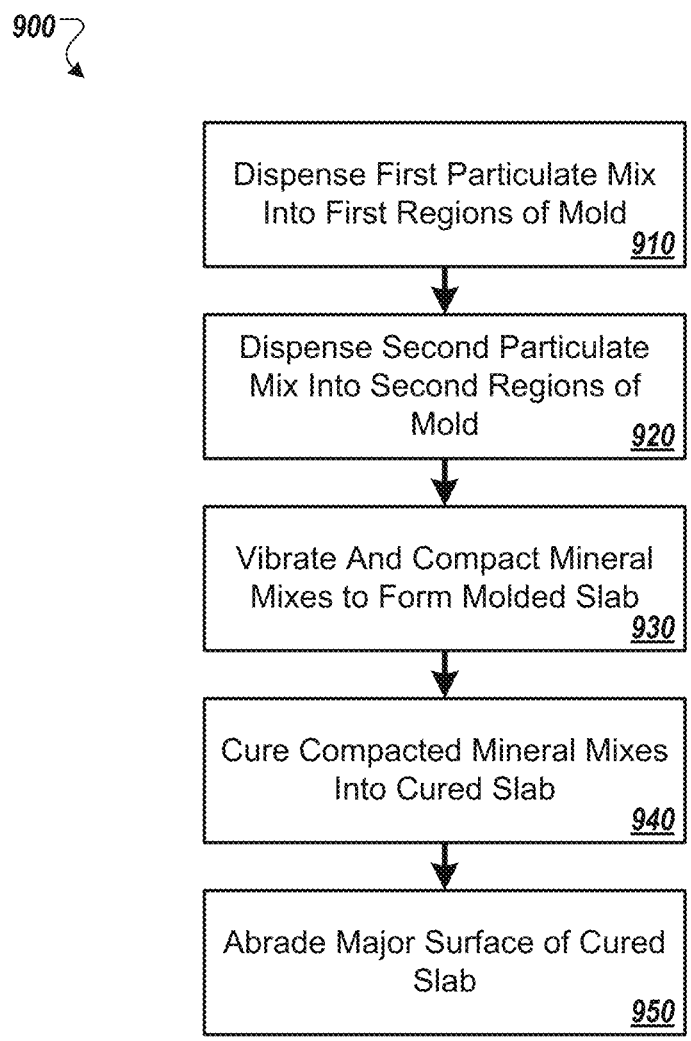
FIG. 9 is a flow diagram of an example process for producing a processed slab product, in accordance with some embodiments.

FIG. 9 is a flow diagram of an example process 900 for producing a processed slab product from a plurality of different particulate mineral mixes. In some embodiments, the process 900 is performed by parts or all of the example systems 500-800 described with reference to FIGS. 5-8.

At 910 a first particulate mineral mix is dispensed into a first set of regions of a slab mold. For example, a first particulate mineral mix is deposited into the slab mold to become one or more veins.

At 920, a second particulate mineral mix is dispensed into a second set of regions of the slab mold. For example, the dispenser dispenses primary fill into the slab mold.

At 930, the first particulate mineral mix and the second particulate mineral mix arranged in the slab mold are contemporaneously vibrated and compacted so as to form a molded slab that is generally rectangular and has a slab thickness and a major surface having a width of at least 2 feet and a length of at least 6 feet. For example a vibro-compaction press applies compaction pressure, vibration, and/or vacuum to the contents inside the filled mold, thereby converting the particulate mixes into a rigid slab.

At 940, the compacted first particulate mineral mix and the compacted second particulate mineral mix are cured into a cured slab. For example, the curing station heats or otherwise cures the compacted slabs to further strengthen the slabs inside the filled molds.

In some implementation, the first particulate mineral mix can include one or more first component materials having a first hardness, and the first particulate mineral mix can include one or more first component materials having a second hardness different from the first hardness. For example, the primary fill may be made up of a relatively hard particulate mineral mix and a resin binder that cures relatively hard, whereas the veins may be made up of a relatively hard particulate mineral mix and a resin binder that is somewhat softer (e.g., allowing the binder to erode away to expose more hard particulate, possibly resulting in a surface like sandstone or fine sandpaper). In some embodiments, the particulate mineral mix composition results in particulates with rounded facets and a microscopically bumpy surface.

At 950, the major surface of the cured slab is abraded at locations of the first particulate mineral mix and the second particulate mineral mix with an abrading head to partly remove portions of the major surface such that the first particulate mineral mix in the first set of regions define a first thickness perpendicular to the slab width and the slab length, and the second particulate mineral mix in the second set of regions define a second thickness perpendicular to the slab width and the slab length. For example, the surface treatment stations 640, 740, and/or 840 can be used to abrade the major surface, and due to the differences (e.g., hardness, abrasion resistance) among regions of the primary fill and the veins, the various regions abrade or erode to different depths resulting in the primary fill and the veins having different thicknesses across the major surface 632 (e.g., the difference between $T_1$ and $T_2$ in FIG. 2).

In some embodiments, abrading a portion of the major surface of the cured slab includes removing an amount of the major surface in the first set of regions to an average first thickness perpendicular to the slab width and the slab length that is at least partly different from a second average thickness removed from the second set of regions, wherein the first texture is based on the first average thickness and the second texture is based on the second average thickness. For example, the primary fill abrades to average thickness $T_1$ while the veins abrade to average thickness $T_2$, less than $T_1$.

In some embodiments, one of the first set of regions and the second set of regions can define a majority of the major surface, and the other of the first set of regions and the second set of regions can define a vein extending at least partly across the major surface. For example, the primary fill 51 occupies a first set of regions within the slab 50, and other particulate mineral mixes form the veins 52 and 53, which extend partly or entirely across the surfaces and edges of the slab 50.

In some implementations, abrading the major surface of the cured slab includes abrading substantially the entire major surface. For example, the system 600 can be configured to apply the same type of abrasion across the entire major surface 632 (e.g., causing substantially all of the primary fill 691 exposed at the major surface 632 to erode to substantially the same average depth, and causing the veins 692 and 693 to each erode to their own respective average depths across the entire major surface 632).

In some implementations, abrading the major surface of the cured slab can include abrading by at least one of an abrasive brush and mechanical application of an abrasive fluid compound. For example, the example abrasive brushes 642 can be used to apply a fluid compound containing abrasive material to the major surface 632.

In some implementations, the first set of regions can have a first texture and the second set of regions can have a second texture different from the first texture. For example, the primary fill 51 may have a smooth, glossy texture, while the vein 52 may have a relatively rougher, matte texture. In some embodiments, the roughness of the vein 52 may be quantified by Ra, Rq, and Rz values.

In some implementations, the first texture can be defined by one or more of a first roughness, a first gloss, and a first average thickness that extends perpendicular to the slab width and the slab length, and the second texture can be defined by one or more of a second roughness, a second gloss, and a second average thickness that extends perpendicular to the slab width and the slab length. For example, the primary fill 51 and the veins 52, 53 can each be made up of mineral particulate mixes that each have particles that are more rounded or more faceted in shape, or have particulates or binders that have relatively different in terms of light absorption and reflectivity, or exhibit relatively different levels of receptivity to polishing. In another example, as described above, the texture can be defined by some areas having different thicknesses than others (e.g., the example veins 52, 53 have an example thickness of $T_2$ whereas the example primary fill has an example thickness of $T_1$, resulting in boundaries where the transitions between the different thicknesses can be felt or seen).

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A processed slab formed from a plurality of particulate mineral mixes, comprising:
 a slab width that is at least 2 feet;
 a slab length that extends perpendicular to the slab width and that is at least 6 feet, the slab length and the slab width defining a top major surface that is contoured;
 a slab thickness that extends perpendicular to the slab width and the slab length, the slab length greater than the slab width, the slab width greater than the slab thickness; and
 a first pattern defined by a first particulate mineral mix, the first pattern exposed along the top major surface of the slab and exposed along a bottom major surface of the slab, and defining a first thickness that extends perpendicular to the slab width and the slab length, the first pattern exposed along the top major surface of the slab defining a first plane; and
 a second pattern defined by a second particulate mineral mix different from the first particulate mineral mix, the second pattern exposed along the top major surface of the slab and exposed along the bottom major surface of the slab, and defining a second thickness that extends perpendicular to the slab width and the slab length, the first thickness of the first pattern different from the second thickness of the second pattern, wherein at least a portion of the second pattern is recessed from the first plane, projects from the first plane, or is both recessed from and projects from the first plane.

2. The processed slab of claim 1, wherein the first pattern is exposed along a bottom major surface of the slab.

3. The processed slab of claim 1, wherein the first pattern exposed along the top major surface of the slab has a first texture based on the first particulate mineral mix, and the second pattern exposed along the top major surface of the slab has a second texture, different from the first texture, based on the second particulate mineral mix.

4. The processed slab of claim 3, wherein the first texture has a first roughness and the second texture has a second roughness that is different from the first roughness.

5. The processed slab of claim 1, wherein the first pattern has a first average gloss value and the second pattern has a second average gloss value that is different from the first average gloss value.

6. The processed slab of claim 1, wherein the first pattern has a first average thickness perpendicular to the slab width and the slab length, and the second pattern has a second average thickness perpendicular to the slab width and the slab length, and wherein the first average thickness is different from the second average thickness.

7. A processed slab comprising:
a slab width that is at least 2 feet;
a slab length that extends perpendicular to the slab width and that is at least 6 feet, the slab length and the slab width defining a top major surface;
a first region exposed along the top major surface of the slab and exposed along a bottom major surface of the slab and having a first average thickness perpendicular to the slab width and the slab length; and
a second region exposed along the top major surface of the slab and exposed along a bottom major surface of the slab and having a second average thickness perpendicular to the slab width and the slab length,
wherein the first average thickness is different from the second average thickness.

8. The processed slab of claim 7, wherein the first region has a first hardness and the second region has a second hardness that is different from the first hardness.

9. The processed slab of claim 7, wherein the first region has a first texture and the second region has a second texture that is different from the first texture.

10. The processed slab of claim 7, wherein the first region has a first gloss and the second region has a second gloss that is different from the first gloss.

11. The processed slab of claim 7, wherein the first region comprises a background of the processed slab defined by a first particulate mineral mix.

12. The processed slab of claim 11, wherein the second region comprises a vein of the processed slab defined by a second particulate mineral mix.

13. The processed slab of claim 12, further comprising a tactile transition between the first average thickness and the second average thickness.

14. The processed slab of claim 7, further comprising:
a third region exposed along the top major surface of the slab having a third average thickness perpendicular to the slab width and the slab length,
wherein the third average thickness is different from the first average thickness.

15. The processed slab of claim 14, wherein the second average thickness is different from the third average thickness.

16. The processed slab of claim 7, wherein at least a portion of the second region projects above the top major surface.

17. A processed slab comprising:
a primary fill comprising a first particulate mix in a first location and exposed along a top major surface of the slab and exposed along a bottom major surface of the slab;
a vein comprising a second particulate mix in a second location and exposed along the top major surface of the slab and exposed along the bottom major surface of the slab;
the top major surface and the bottom major surface each defined by a slab width and a slab length that extends perpendicular to the slab width; and
a slab thickness between the top major surface and the bottom major surface that varies between the first location and the second location.

18. The processed slab of claim 17, wherein a difference between a first thickness at the first location and a second thickness at the second location is between 0.01 mm and 10 mm.

19. The processed slab of claim 17, further comprising an edge face proximate the top major surface, wherein the vein extends at least partially along the edge face.

20. The processed slab of claim 17, wherein at least a portion of the vein projects above the top major surface.

* * * * *